US011659127B2

(12) United States Patent
Sato

(10) Patent No.: US 11,659,127 B2
(45) Date of Patent: May 23, 2023

(54) INFORMATION PROCESSING APPARATUS, INFORMATION PROCESSING SYSTEM, AND INFORMATION PROCESSING METHOD CONFIGURED TO PERFORM SETTING A STATE OF A DOCUMENT TO ALREADY READ OR UNREAD BASED ON THE PRINTING OF PAGES OF AN ACCUMULATED DOCUMENT IN STORAGE

(71) Applicant: Ricoh Company, Ltd., Tokyo (JP)

(72) Inventor: Tadashi Sato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/105,896

(22) Filed: Nov. 27, 2020

(65) Prior Publication Data

US 2021/0168262 A1  Jun. 3, 2021

(30) Foreign Application Priority Data

Nov. 29, 2019 (JP) .............................. JP2019-217585
Nov. 9, 2020 (JP) .............................. JP2020-186859

(51) Int. Cl.
*H04N 1/00* (2006.01)
*H04N 1/327* (2006.01)

(52) U.S. Cl.
CPC ..... *H04N 1/32745* (2013.01); *H04N 1/00689* (2013.01); *H04N 1/00692* (2013.01); *H04N 1/00697* (2013.01); *H04N 1/32736* (2013.01)

(58) Field of Classification Search
CPC ........... H04N 1/00689; H04N 1/00692; H04N 1/00697; H04N 1/32432; H04N 1/32496; H04N 1/32736; H04N 1/32745; H04N 1/00206; H04N 1/00209; H04N 1/00236; H04N 1/00244
USPC ............................... 358/1.11–1.18, 400–404
See application file for complete search history.

(56) References Cited

U.S. PATENT DOCUMENTS

| 5,764,375 A * | 6/1998 | Park .................... H04N 1/32037 358/440 |
| 2002/0156923 A1* | 10/2002 | Tanimoto ............... H04N 1/324 709/219 |
| 2003/0210921 A1* | 11/2003 | Ueda .................... G03G 15/231 399/82 |
| 2004/0190074 A1* | 9/2004 | Kato .................. H04N 1/00238 358/1.15 |
| 2007/0071461 A1* | 3/2007 | Kitano .................. B65H 29/14 399/16 |

(Continued)

FOREIGN PATENT DOCUMENTS

| JP | 2002-215544 | 8/2002 |
| JP | 2002-334074 | 11/2002 |
| JP | 2005-197964 | 7/2005 |

(Continued)

*Primary Examiner* — Chad Dickerson
(74) *Attorney, Agent, or Firm* — Xsensus LLP

(57) ABSTRACT

An information processing apparatus includes circuitry configured to: accumulate a document received by FAX in a storage; control output of the accumulated document based on an operation of a user; and set a state of the document to unread in response to the document being accumulated in the storage, and set the state of the document to already read on condition that output of all pages of the document is completed.

10 Claims, 20 Drawing Sheets

(56) References Cited

U.S. PATENT DOCUMENTS

2009/0116076 A1* 5/2009 Nagano .............. H04N 1/00477
                                                    358/403
2015/0092250 A1* 4/2015 Goto ................ H04N 1/00408
                                                    358/407

FOREIGN PATENT DOCUMENTS

JP      2006-262375     9/2006
JP      2009-115877     5/2009

* cited by examiner

FIG.8

| DOCUMENT ID | RECEIVED DATE AND TIME | DESTINATION | NUMBER OF PAGES | UNREAD STATUS | FILE PATH | JOB ID | JOB STATUS |
|---|---|---|---|---|---|---|---|
| 0001 | 2019/11/01 10:00 | 03-1111-xxxx | 6 | UNREAD | <path>/0001 | - | - |
| 0002 | 2019/11/01 11:00 | 03-3333-xxxx | 5 | UNREAD | <path>/0002 | - | - |
| 0003 | 2019/11/01 13:00 | 045-5555-xxxx | 3 | UNREAD | <path>/0003 | - | - |
| 0004 | 2019/11/01 15:00 | 044-7777-xxxx | 10 | UNREAD | <path>/0004 | - | - |
| 0005 | 2019/11/01 16:00 | 03-9999-xxxx | 2 | UNREAD | <path>/0005 | - | - |
| ... | ... | ... | ... | | | | |

181

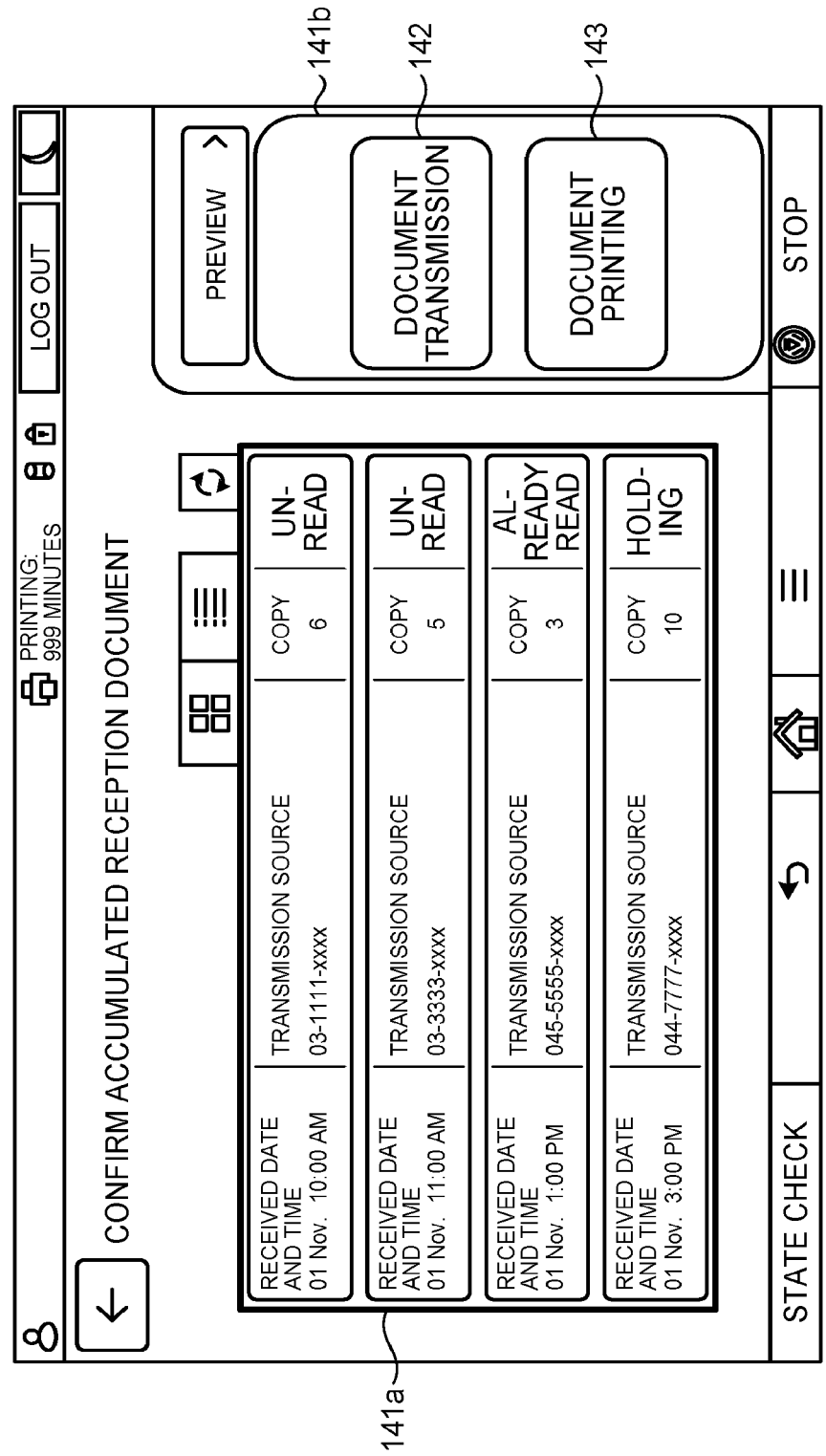

FIG.10A

| JOB ID | TOTAL NUMBER OF PAGES | NUMBER OF PRINTED PAGES | PROCESSING STATUS |
|---|---|---|---|
| 0001 | 6 | 2 | PRINTING |
| 0002 | 3 | 0 | WAITING FOR PRINTING |
| 0003 | 10 | 0 | WAITING FOR PRINTING |
| ... | ... | ... | |

FIG.10B

| JOB ID | TOTAL NUMBER OF PAGES | NUMBER OF PRINTED PAGES | PROCESSING STATUS |
|---|---|---|---|
| 0001 | 6 | 6 | PRINTING COMPLETION |
| 0002 | 3 | 1 | PRINTING |
| 0003 | 10 | 8 | WAITING FOR PRINTING |
| ... | ... | ... | |

FIG.10C

| JOB ID | TOTAL NUMBER OF PAGES | NUMBER OF PRINTED PAGES | PROCESSING STATUS |
|---|---|---|---|
| 0001 | 6 | 6 | PRINTING COMPLETION |
| 0002 | 3 | 2 | PRINTING COMPLETION |
| 0003 | 10 | 8 | PRINTING |
| ... | ... | ... | |

FIG.11

| DOCUMENT ID | RECEIVED DATE AND TIME | DESTINATION | NUMBER OF PAGES | UNREAD STATUS | FILE PATH | JOB ID | JOB STATUS |
|---|---|---|---|---|---|---|---|
| 0001 | 2019/11/01 10:00 | 03-1111-xxxx | 6 | ALREADY READ | <path>/0001 | 0001 | PRINTING COMPLETION |
| 0002 | 2019/11/01 11:00 | 03-3333-xxxx | 5 | UNREAD | <path>/0002 | - | - |
| 0003 | 2019/11/01 13:00 | 045-5555-xxxx | 3 | UNREAD | <path>/0003 | 0002 | PRINTING FAILURE |
| 0004 | 2019/11/01 15:00 | 044-7777-xxxx | 10 | UNREAD | <path>/0004 | 0003 | UNDER PRINT INSTRUCTION |
| 0005 | 2019/11/01 16:00 | 03-9999-xxxx | 2 | UNREAD | <path>/0005 | - | - |
| ... | ... | ... | ... | | | | |

| JOB ID | NUMBER OF PRINTED PAGES | PROCESSING STATUS |
|---|---|---|
| 0001 | 2 | PRINTING COMPLETION |
| 0002 | 0 | WAITING FOR PRINTING |
| 0003 | 0 | WAITING FOR PRINTING |
| ... | ... | |

FIG.14

| JOB ID | JOB TYPE | NOTIFICATION APPLICATION | NUMBER OF PRINTED PAGES | PROCESSING STATUS |
|---|---|---|---|---|
| 0007 | NORMAL PRINTING | - | 20 | PRINTING COMPLETION |
| 0008 | MANUAL PRINTING OF FAX ACCUMULATION DOCUMENT | FAX APPLICATION | 3 | PRINTING COMPLETION |
| 0009 | COPY PRINTING | - | 1 | PRINTING |
| ... | ... | ... | ... | |

FIG.20

| DOCUMENT ID | RECEIVED DATE AND TIME | DESTINATION | NUMBER OF PAGES | UNREAD STATUS |
|---|---|---|---|---|
| 1001 | 2018/01/19 11:00 | 0123456789 | 6 | UNREAD |
| 1002 | 2018/01/19 12:00 | 9876543210 | 5 | HOLDING |
| 1003 | 2018/01/19 13:00 | 1234567890 | 3 | HOLDING |

FIG.21

| JOB ID | JOB TYPE | NOTIFICATION APPLICATION | DOCUMENT ID | PROCESSING STATUS |
|---|---|---|---|---|
| 0001 | ACCUMULATED DOCUMENT MANUAL PRINTING (OWN MACHINE) | - | 1002 | EXECUTING |
| 0002 | ACCUMULATED DOCUMENT MANUAL PRINTING (SLAVE UNIT) | 1ST FLOOR WEST | 1003 | EXECUTING |
| 0003 | DOCUMENT TRANSMISSION | - | 8001 | EXECUTING |
| 0004 | REPORT PRINTING | - | - | WAITING FOR EXECUTION |

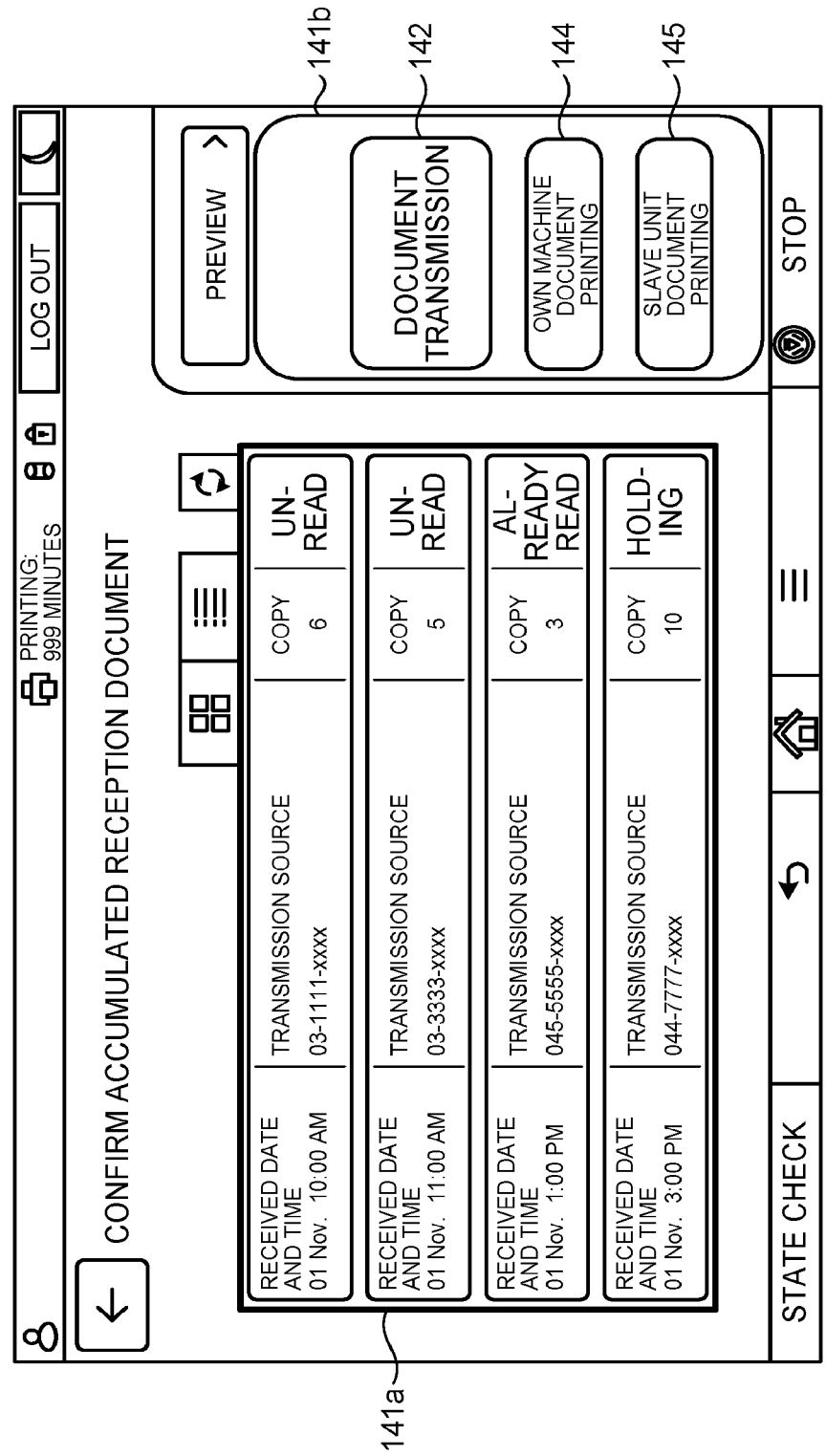

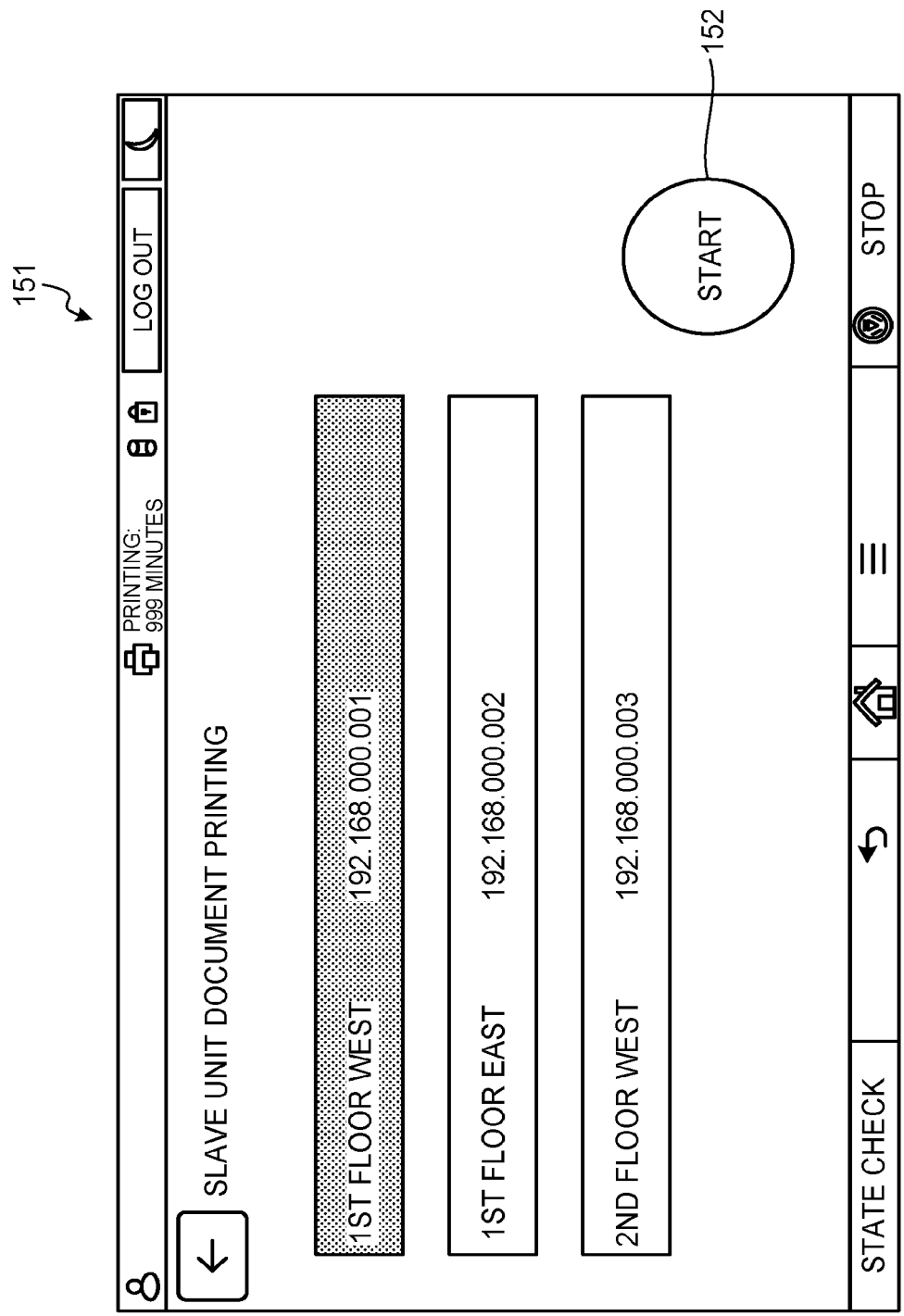

INFORMATION PROCESSING APPARATUS, INFORMATION PROCESSING SYSTEM, AND INFORMATION PROCESSING METHOD CONFIGURED TO PERFORM SETTING A STATE OF A DOCUMENT TO ALREADY READ OR UNREAD BASED ON THE PRINTING OF PAGES OF AN ACCUMULATED DOCUMENT IN STORAGE

CROSS-REFERENCE TO RELATED APPLICATIONS

The present application claims priority under 35 U.S.C. § 119 to Japanese Patent Application No. 2019-217585, filed on Nov. 29, 2019 and Japanese Patent Application No. 2020-186859, filed on Nov. 9, 2020. The contents of which are incorporated herein by reference in their entirety.

BACKGROUND OF THE INVENTION

1. Field of the Invention

The present invention relates to an information processing apparatus, an information processing system, and an information processing method.

2. Description of the Related Art

Conventionally, there is a method of switching a state of a document received by facsimile (FAX) from unread to already read according to an output instruction by a user.

For example, according to Japanese Unexamined Patent Application Publication No. 2009-115877, when a user instructs to preview a document, the state of the document is switched from unread to already read.

As another example, when a user instructs to print a document, the state of the document is switched from unread to already read.

For example, in the case of print output, a user has instructed to print a document, but there may be a case where some or all pages of the document are not printed due to a paper jam or the like. When such a case occurs, according to the above-mentioned conventional method, the document is managed to be already read even though the user cannot view the unprinted page. That is, the state of the documents received by FAX is not managed appropriately.

SUMMARY OF THE INVENTION

An information processing apparatus includes circuitry configured to: accumulate a document received by FAX in a storage; control output of the accumulated document based on an operation of a user; and set a state of the document to unread in response to the document being accumulated in the storage, and set the state of the document to already read on condition that output of all pages of the document is completed.

BRIEF DESCRIPTION OF THE DRAWINGS

FIG. 8 is a schematic diagram illustrating an example of a data structure of a document management table according to the second embodiment;

FIG. 9 is a schematic diagram illustrating an example of a screen displayed by a FAX operation display unit according to the second embodiment;

FIGS. 10A to 10C are schematic diagrams illustrating an example of a data structure of a print job management table according to the second embodiment;

FIG. 11 is a schematic diagram illustrating an example of a data structure of a FAX data management table according to the second embodiment at a timing when the state of the print job management table is in the state illustrated in FIG. 10C;

FIG. 13 is a schematic diagram illustrating another example of the data structure of the print job management table according to the second embodiment;

FIG. 14 is a schematic diagram illustrating yet another example of the data structure of the print job management table according to the second embodiment;

FIG. 20 is a schematic diagram illustrating an example of a data structure of a FAX data management table according to the fourth embodiment;

FIG. 21 is a schematic diagram illustrating an example of a data structure of a print job management table according to the fourth embodiment;

FIG. 22 is a schematic diagram illustrating an example of a screen displayed by a FAX operation display unit;

FIG. 23 is a diagram illustrating an example of a setting screen; and

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
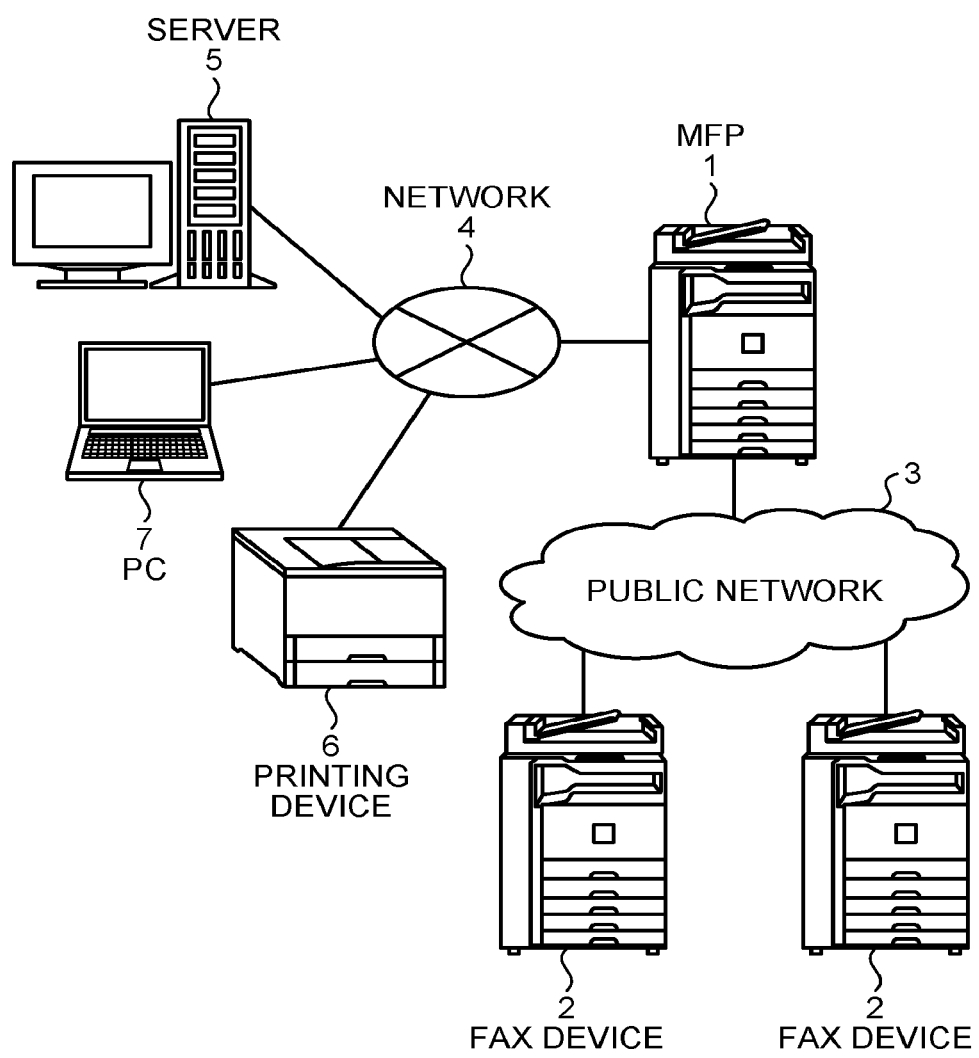
FIG. 1 is a schematic diagram illustrating a connection example of an MFP according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing apparatus, an information processing system, and an information processing method of appropriately managing a document received by FAX.

An information processing apparatus, an information processing system, and an information processing method according to embodiments will be described in detail with reference to the accompanying drawings. Note that the present invention is not limited to the embodiments described below.

First Embodiment

An information processing apparatus according to an embodiment can be applied to any device that manages a document received by FAX. In a first embodiment, as an example, a case where the information processing apparatus according to the embodiment is applied to a multi function printer (MFP) will be described. The MFP described here is a multifunction peripheral that includes at least a FAX function and a printer function, and further realizes a plurality of functions, such as a scanner function and a copy function, in one housing.

FIG. 1 is a schematic diagram illustrating a connection example of an MFP 1 according to the first embodiment. The MFP 1 is connected to one or more FAX devices 2 (two in the example of FIG. 1) via a public network 3. Each FAX device 2 can transmit a document to the MFP 1 via the public network 3. In addition, the MFP 1 can transmit a document to each FAX device 2 via the public network 3.

Hereinafter, the document means a document that the MFP 1 receives by FAX unless otherwise specified.

The MFP 1 is connected to a network 4 such as the Internet or intranet. A server 5, a printing device 6, a personal computer (PC) 7, and the like are connected to the network 4.

The MFP 1 accumulates the received document in an internal storage unit (storage unit 16 described later). The document accumulated in the storage unit can be output in various ways. For example, the document in the storage unit can be printed by the MFP 1 having a printer function or the printing device 6. Alternatively, the document in the storage unit can be delivered to the server 5 or the PC 7. Alternatively, the document in the storage unit can be transmitted to the FAX device 2 via the public network 3. That is, the output may include printing, delivering, faxing, or the like.

Figure 2:
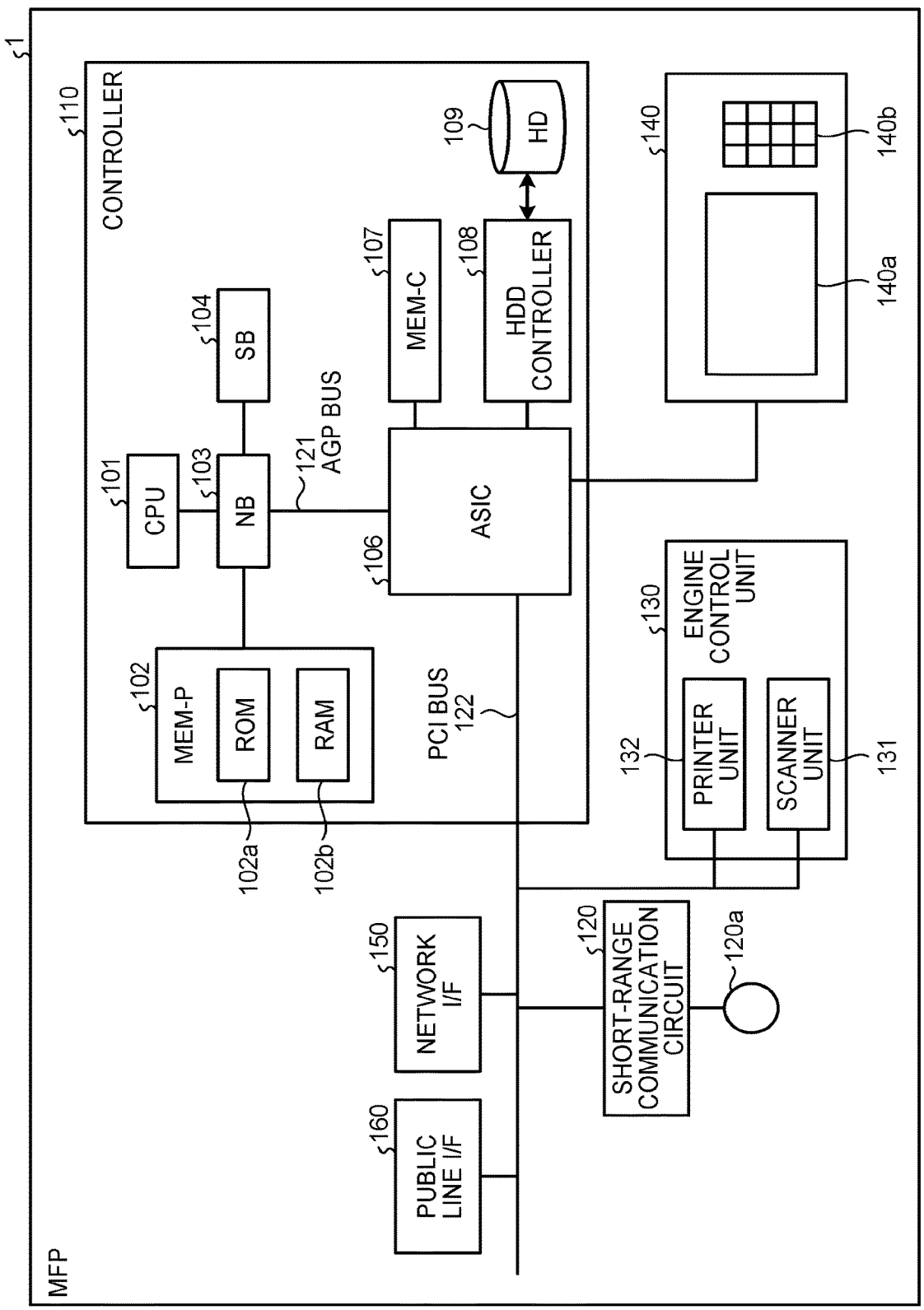
FIG. 2 is a schematic diagram illustrating an example of a hardware configuration of the MFP according to the first embodiment.

FIG. 2 is a schematic diagram illustrating an example of a hardware configuration of the MFP 1 according to the first embodiment.

As illustrated in FIG. 2, the MFP 1 includes a controller 110, a short-range communication circuit 120, an engine control unit 130, an operation panel 140, a network I/F 150, and a public line I/F 160.

Among them, the controller 110 includes a central processing unit (CPU) 101, a system memory (MEM-P) 102, a north bridge (NB) 103, a south bridge (SB) 104, an application specific integrated circuit (ASIC) 106, a local memory (MEM-C) 107, a hard disk drive (HDD) controller 108, and a hard disk (HD) 109 which are main components of a computer, and the configuration is such that the NB 103 and the ASIC 106 are connected to each other by an accelerated graphics port (AGP) bus 121.

Among them, the CPU 101 is a control unit that controls the entire MFP 1. The NB 103 is a bridge for connecting the CPU 101 to the MEM-P 102, the SB 104, and the AGP bus 121, and includes a memory controller that controls reading and writing from and to the MEM-P 102, a peripheral component interconnect (PCI) master, and an AGP target.

The MEM-P 102 includes a ROM 102a which is a memory for storing programs or data that realizes each function of the controller 110, and a RAM 102b which is used as a memory for loading programs or data and for drawing when printing a memory. Note that the program stored in the RAM 102b may be a file in an installable format or an executable format, and may be provided by being recorded on a computer-readable recording medium such as a CD-ROM, CD-R, or DVD.

The SB 104 is a bridge for connecting the NB 103 to the PCI device and peripheral devices. The ASIC 106 is an integrated circuit (IC) for image processing applications that has hardware elements for image processing, and has a role of a bridge that connects the AGP bus 121, a PCI bus 122, the HDD controller 108, and the MEM-C 107. The ASIC 106 includes a PCI target and an AGP master, an arbiter (ARB) that is a core of the ASIC 106, a memory controller that controls the MEM-C 107, a plurality of direct memory access controllers (DMACs) that rotates image data, or the like by hardware logic or the like, and a PCI unit that transmits data between a scanner unit 131 and a printer unit 132 via the PCI bus 122. Note that a universal serial bus (USB) interface or an Institute of Electrical and Electronics Engineers 1394 (IEEE 1394) interface may be connected to the ASIC 106.

The MEM-C 107 is a local memory used as a copy image buffer and a code buffer. The HD 109 is a storage for accumulation of image data, accumulation of font data used for printing, and accumulation of forms. The HD 109 controls reading or writing of data from or to the HD 109 according to the control of the CPU 101. The AGP bus 121 is a bus interface for a graphics accelerator card proposed to speed up graphics processing, and can speed up a graphics accelerator card by directly accessing the MEM-P 102 with high throughput.

In addition, the short-range communication circuit 120 is provided with a short-range communication circuit 120a. The short-range communication circuit 120 is a communication circuit such as NFC and Bluetooth (registered trademark).

Further, the engine control unit 130 includes the scanner unit 131 and the printer unit 132. In addition, the operation panel 140 includes a panel display unit 140a such as a touch panel that displays a current setting value, a selection screen, or the like and receives input from an operator, and an operation panel 140b that includes a ten key that receives a setting value of image formation conditions such as density setting conditions, a start key that receives copy start instructions, and the like. The controller 110 controls the entire MFP 1, for example, drawing, communication, input from the operation panel 140, and the like. The scanner unit 131 or the printer unit 132 includes image processing parts such as error diffusion or gamma conversion. Note that the panel display unit 140a is an example of a display device.

Note that the MFP 1 can sequentially switch and select a document box function, a copy function, a printer function, and a FAX function by using an application switching key on the operation panel 140. When the document box function is selected, a document box mode is set, when the copy function is selected, a copy mode is set, when the printer function is selected, a printer mode is set, and when the FAX function is selected, a facsimile mode is set.

In addition, the network I/F 150 is an interface for data communication using the network 4. The public line I/F 160 is an interface for transmitting and receiving a document via the public network 3. The short-range communication circuit 120, the network I/F 150, and the public line I/F 160 are electrically connected to the ASIC 106 via the PCI bus 122.

Figure 3:
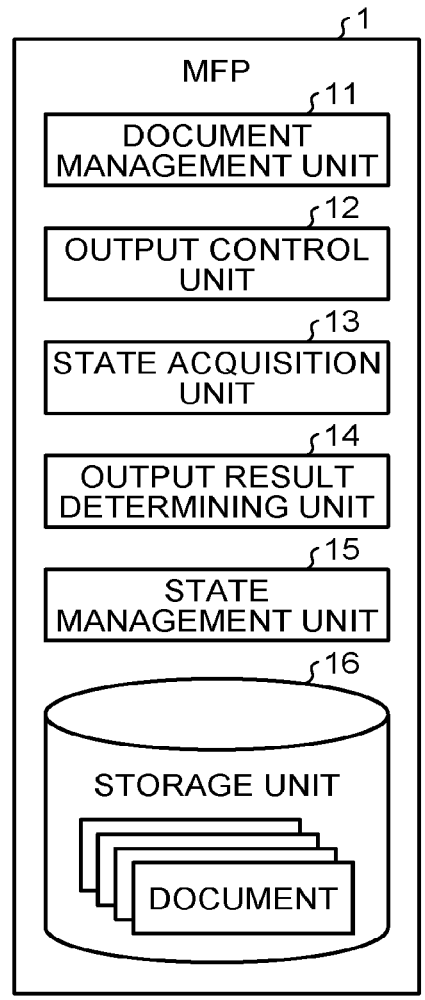
FIG. 3 is a schematic diagram illustrating an example of a function configuration of the MFP according to the first embodiment.

FIG. 3 is a schematic diagram illustrating an example of a function configuration of the MFP 1 according to the first embodiment.

As illustrated in FIG. 3, the MFP 1 includes the storage unit 16 in which one or more documents that are received from one or more FAX devices 2 are accumulated. The storage unit 16 is configured by a storage device storing data, such as the RAM 102b, a MEM-C 907, or the HD 109. Note that the storage unit 16 may be configured by a storage device other than these storage devices. The storage unit 16 may be configured by a detachable storage device, or may be configured by a storage device connected to the outside of the MFP 1 via the network 4 or other communication unit. The storage device connected to the outside of the MFP 1 via the network 4 or other communication units is, for example, cloud storage that can perform storage, sharing, or the like of data on the Internet.

The MFP 1 further includes a document management unit 11, an output control unit 12, a state acquisition unit 13, an output result determining unit 14, and a state management unit 15.

The document management unit 11 stores the documents received by FAX, that is, the document received from the FAX device 2 via the public network 3, in the storage unit 16. This causes the document to be accumulated in the storage unit 16.

The output control unit 12 controls the output of the document accumulated in the storage unit 16.

For example, the user can specify a document and instruct to print the document by operating the external device such as the PC 7 or the operation panel 140. The output control unit 12 prints the specified document using the printer unit 132 based on the print instruction. The output control unit 12 may transmit a document to the printing device 6.

Alternatively, the user can specify a document and instruct to deliver the document by operating the external device such as PC 7 or the operation panel 140. The output control unit 12 delivers the specified document via the network I/F 150 based on the delivery instruction.

Alternatively, the user can specify a document and instruct to transmit the document by FAX by operating the external device such as the PC 7 or the operation panel 140.

The output control unit 12 transmits the specified document via the public network 3 based on the transmission instruction.

The state acquisition unit 13 acquires the state of the output of the document.

More specifically, the state acquisition unit 13 acquires the number of pages, which has been output, from the document specified as an output target. For example, if the output is printed, the number of pages for which the paper ejection is completed is counted as the number of pages which has been output. When the output is delivered or transmitted by FAX, the number of pages which has been delivered or transmitted is counted as the number of pages which has been output.

The output result determining unit 14 determines whether or not all pages of the document specified as the output target have been output based on the number of pages acquired by the state acquisition unit 13.

The state management unit 15 manages the state of the document.

Specifically, the state management unit 15 sets the state of the document to unread when the document is stored in the storage unit 16. Then, the state management unit 15 sets the state of the document to already read on the condition that the output of all pages of the document is completed.

When the output of some or all of the pages of the document is not completed even after the output of the document is instructed, that is, when the pages, which has not been output, among the pages constituting the document remain, the state management unit 15 does not set the state of the document to already read.

For example, when the printing of the document is instructed and the instructed printing is executed, the output of all pages of the document may not be completed due to paper out, paper jam, an instruction to cancel printing, or the like. In such cases, the state management unit 15 does not set the state of the document to already read. The state management unit 15 may keep the state of the document unread, or may set the state of the document to a name different from either unread or already read.

As described above, according to the embodiment, the state of the document is set to already read on the condition that the output of all pages of the document for which the output is specified is completed.

Note that the functions of the document management unit 11, the output control unit 12, the state acquisition unit 13, the output result determining unit 14, and the state management unit 15 are realized by causing, for example, the CPU 101 to execute an information processing program.

Figure 4:
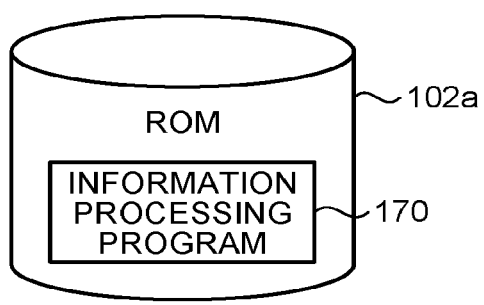
FIG. 4 is a schematic diagram illustrating an example of a mode of storing an information processing program according to the first embodiment.

The information processing program 170 is pre-stored in the ROM 102a, for example, as illustrated in FIG. 4. The CPU 101 loads the information processing program 170 from the ROM 102a into a RAM 102b and executes the information processing program 170 loaded into the RAM 102b, thereby functioning as the document management unit 11, the output control unit 12, the state acquisition unit 13, the output result determining unit 14, and the state management unit 15.

That is, the MFP 1 includes a processor such as the CPU 101 and a memory such as the ROM 102a, the RAM 102b, the MEM-C 107, or the HD 109, and this configuration can be regarded as a normal computer configuration. The information processing program 170, which is a computer program, can allow the MFP 1 with the computer configuration to function as the document management unit 11, the output control unit 12, the state acquisition unit 13, the output result determining unit 14, and the state management unit 15.

Note that the storage device in which the information processing program 170 is pre-stored is not limited to the ROM 102a. The information processing program 170 may be pre-stored in a non-volatile storage device such as the HD 109.

In addition, the information processing program 170 may be a file in an installable format or executable format and may be provided by being recorded on a computer-readable recording medium such as a CD-ROM, a flexible disk (FD), a CD-R, or a digital versatile disk (DVD).

Further, the information processing program 170 may be stored on a computer connected to the network such as the Internet and provided by downloading via the network. Further, the information processing program 170 may be provided or distributed via the network such as the Internet.

Note that each of the functions of the document management unit 11, the output control unit 12, the state acquisition unit 13, the output result determining unit 14, and the state management unit 15 can be realized by one or a plurality of processing circuits. Here, the "processing circuit" in the present specification includes a processor programmed to execute each function by software such as a processor implemented by an electronic circuit, or devices such as an application specific integrated circuit (ASIC), a digital signal processor (DSP), a field programmable gate array (FPGA), or the conventional circuit module, which is designed to execute each function described above.

Figure 5:
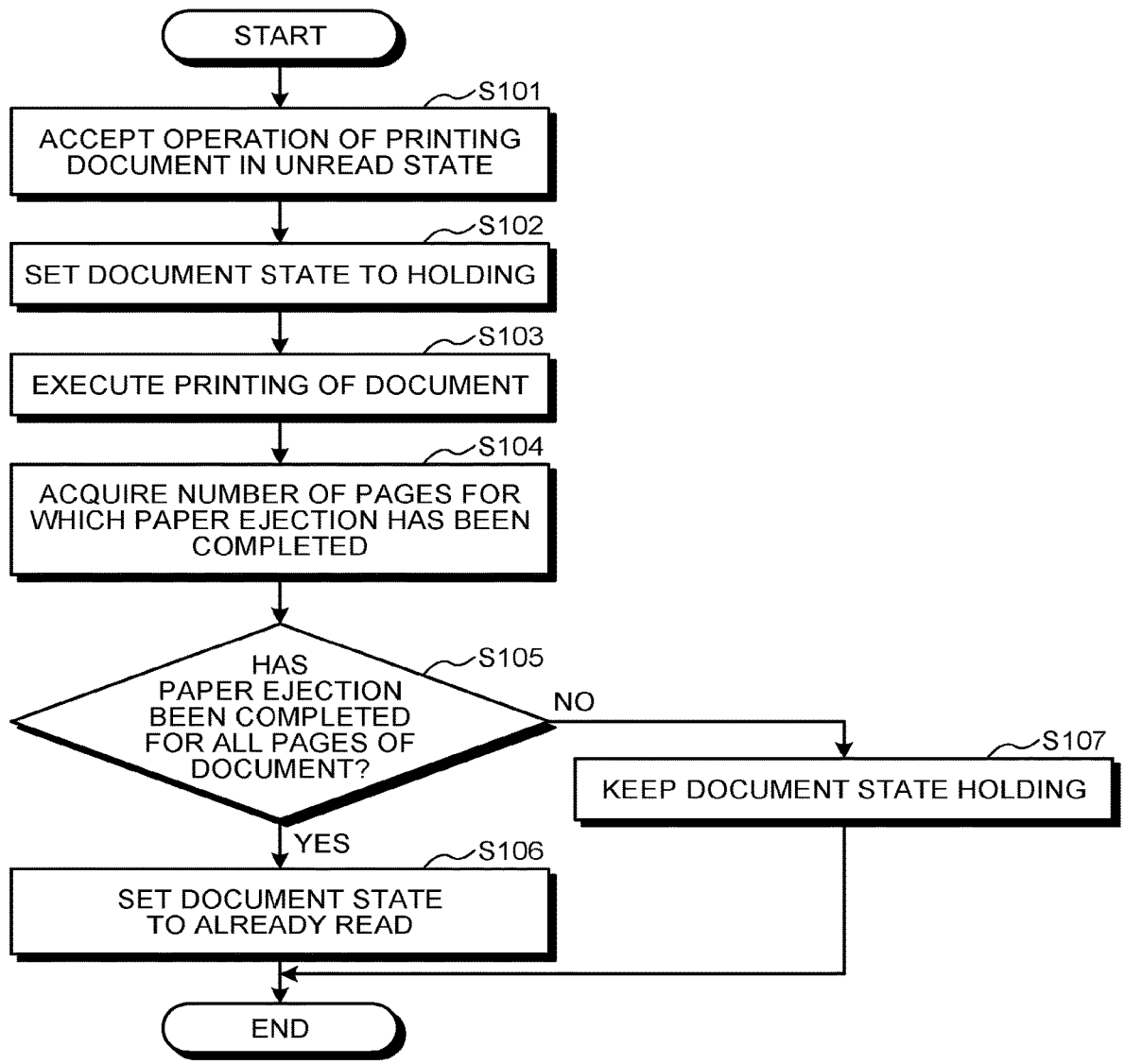
FIG. 5 is a flowchart illustrating an example of an operation of the MFP according to the first embodiment.

FIG. 5 is a flowchart illustrating an example of an operation of the MFP 1 according to the first embodiment. Here, a case will be described where printing is executed as an example of output.

First, the output control unit 12 accepts a printing operation (more accurately, an operation instructing printing) that specifies a document in the unread state, which is performed by a user (S101). Note that the state of the document is set to unread by the state management unit 15 when the document is stored in the storage unit 16. The print instruction may be input via the operation panel 140 or may be input from the external device such as the PC 7. Note that in the description of FIG. 5, the document specified as the print target by the processing of S101 is described as the target document.

The state management unit 15 changes the state of the target document from unread to holding (S102). The holding indicates that the output such as the printing is instructed, but is not yet already read.

The output control unit 12 controls the printer unit 132 to execute printing of the target document (S103).

The state acquisition unit 13 acquires the number of pages for which the paper ejection has been completed when the printing of the target by the printer unit 132 is completed (S104).

The end of the printing execution means that after printing by the printer unit 132 is attempted, the printer unit 132 stops the operation of the printing for some reason, or the printer unit 132 can execute the next printing. That is, the end of the printing execution can occur in various cases in addition to the case where the printing and paper ejection of all pages of the target document are completed. For example, the paper out, the paper jam, or the printing cancellation also causes the printing operation to stop, which is considered to be the end of the printing execution.

The output result determining unit 14 determines whether or not the paper ejection of all pages of the target document has been completed (S105).

For example, the state management unit 15 acquires the number of pages constituting the target document when the target document is stored in the storage unit 16 by the document management unit 11. When the output result determining unit 14 acquires the number of pages for which the paper ejection has been completed from the state acquisition unit 13, the number of pages constituting the target document is acquired from the state management unit 15. Then, the output result determining unit 14 determines whether or not the number of pages constituting the target document matches the number of pages for which the paper ejection has been completed. If the number of pages constituting the target document matches the number of pages for which the paper ejection has been completed, the output result determining unit 14 determines that the paper ejection of all pages of the target document has been completed. If the number of pages constituting the target document does not match the number of pages for which the paper ejection has been completed, the output result determining unit 14 determines that the paper ejection of all pages of the target document has not been completed.

If it is determined that the paper ejection of all pages of the target document has been completed (S105: Yes), the state management unit 15 sets the state of the target document to already read (S106), and the operation of the MFP 1 ends.

When it is determined that the paper ejection of all pages of the target document has not been completed (S105: No), the state management unit 15 keeps the state of the target document holding (S107), and the operation of the MFP 1 ends.

Note that in the explanation of FIG. 5, the state management unit 15 sets the state of the document to holding at the time of the printing execution. The state management unit 15 may not necessarily set the state of the target document to holding at the time of the printing execution, and may keep the state of the document unread. In addition, the name holding is an example. The state management unit 15 can change the state of the document to any name other than the holding in S102. The state management unit 15 may set the state of the document to, for example, in print.

As described above, according to the first embodiment, the MFP 1 as the information processing apparatus includes the document management unit 11 that accumulates the document received by FAX in the storage unit 16, the output control unit 12 that controls the printing of the document based on the user operation, and the state management unit 15 that manages the state of the document. When the document is received, the state management unit 15 sets the state of the document to unread. Then, the state management unit 15 changes the state of the document from unread to already read on the condition that the paper ejection of all pages of the document is completed.

Therefore, cases where the document is managed as already read even though the user cannot view the page because some of the pages of the document are not printed due to the paper out, the paper jam, or the printing cancellation are prevented from occurring. That is, the document received by FAX can be managed appropriately.

Note that the state management unit 15 does not set the state of the document to already read when the output of some or all of the pages of the document is not completed.

Therefore, cases where the document is managed as already read even though the user cannot view the page because some of the pages of the document are not printed due to the paper out, the paper jam, or the printing cancellation are prevented from occurring. That is, the document received by FAX can be managed appropriately.

In addition, the MFP 1 as the information processing apparatus further includes the state acquisition unit 13 that acquires the number of pages of the document for which the paper ejection has been completed by printing the document, and the output result determining unit 14 that determines whether the paper ejection of all pages of the document is completed based on the number of pages for which the paper ejection is completed and determines the output of all pages of the document is completed when the paper ejection of all pages of the document is completed.

As a result, it possible to set the state of the document to already read when the paper ejection of all pages of the document is completed.

Note that, in FIG. 5, the printing is described as an example of the output. The operation as the information processing apparatus of the embodiment can be applied not only when printing the document but also when delivering the document or transmitting the document by FAX.

In one example, the output control unit 12 controls the delivery of the document. The output control unit 12 can deliver the document to the external device such as the server 5 or the PC 7. The state acquisition unit 13 acquires the number of pages, which have been delivered, from the document. The output result determining unit 14 determines whether or not all pages of the document have been delivered based on the number of pages that have been delivered, and determines that the output of all pages of the document is completed when all pages of the document have been delivered. The state management unit 15 sets the state of the document to already read on the condition that the output of all of the pages of the document is completed.

When delivering the document, there may be cases where some or all of the pages of the document are not delivered due to reasons such as the malfunction of the network 4 or the cancellation of delivery. According to the above configuration, the state of the document is not already read when the case occurs. This prevents the case where the document is managed as already read even though the user cannot view some or all of the pages from occurring. That is, the document received by FAX can be managed appropriately.

In another example, the output control unit 12 controls the transmission of the document by FAX. The output control unit 12 may transmit the document to, for example, the FAX device 2 via the public network 3. The state acquisition unit 13 acquires the number of pages, which have been transmitted, from the document. The output result determining unit 14 determines whether or not all pages of the document have been delivered based on the number of pages that have been transmitted, and determines that the output of all pages of the document is completed when all pages of the document have been transmitted. The state management unit 15 sets the state of the document to already read on the condition that the output of all of the pages of the document is completed.

When transmitting the document by FAX, the case where some or all of the pages of the document are not transmitted depending on the state of the public network 3 or the state of the FAX device 2 which is the transmission destination may occur. According to the above configuration, the state of the document is not already read when the case occurs. This prevents the case where the document is managed as already read even though the user cannot view some or all of the pages from occurring. That is, the document received by FAX can be managed appropriately.

Second Embodiment

An MFP according to a second embodiment is described as an MFP 1a. The MFP 1a has the same hardware configuration as the MFP 1 of the first embodiment. Therefore, the description of the hardware configuration of the MFP 1a will be omitted. In the following description, points different from the first embodiment will be described. The same points as in the first embodiment will be omitted or briefly described.

Figure 6:
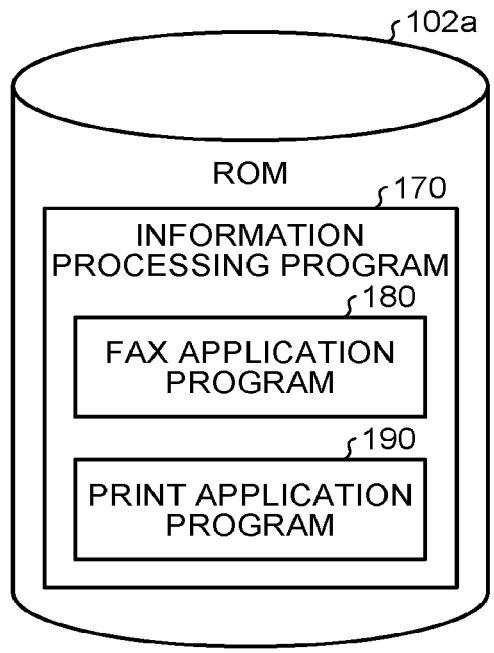
FIG. 6 is a schematic diagram illustrating an example of a configuration of an information processing program according to a second embodiment.

FIG. 6 is a schematic diagram illustrating an example of a configuration of an information processing program 170 according to the second embodiment. The information processing program 170 according to the second embodiment includes a FAX application program (FAX application) 180 that realizes a FAX function and a print application program (print application) 190 that realizes a printer function.

Figure 7:
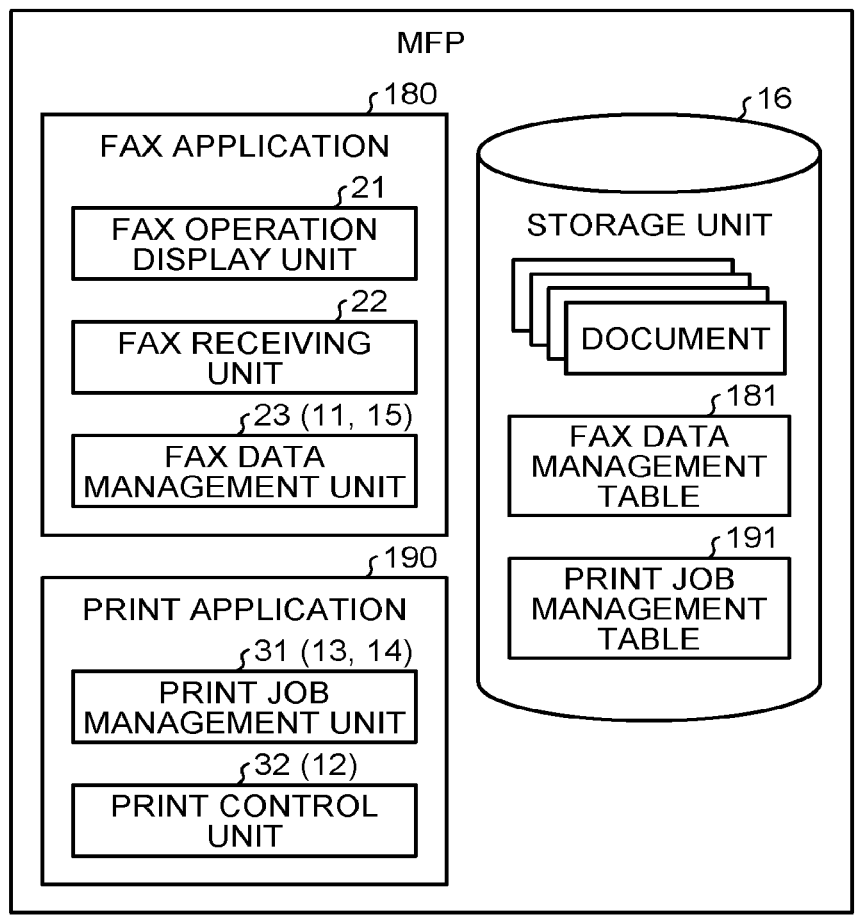
FIG. 7 is a schematic diagram illustrating an example of a function configuration of an MFP according to the second embodiment.

FIG. 7 is a schematic diagram illustrating an example of a function configuration of the MFP 1a according to the second embodiment.

As illustrated in FIG. 7, the MFP 1a includes a FAX operation display unit 21, a FAX receiving unit 22, and a FAX data management unit 23. The functions of the FAX operation display unit 21, the FAX receiving unit 22, and the FAX data management unit 23 are realized by causing, for example, the CPU 101 to execute the FAX application 180. As with each functional component of the first embodiment, some or all of the functions of the FAX operation display unit 21, the FAX receiving unit 22, and the FAX data management unit 23 can be realized by one or a plurality of processing circuits.

The FAX operation display unit 21 executes information display on a panel display unit 140a of the operation panel 140 of the MFP 1, reception of operation input via the panel display unit 140a or an operation panel 140b, and the like. The FAX operation display unit 21 is an example of the display control unit that displays the state of the document on the display device such as the panel display unit 140a.

The FAX receiving unit 22 receives the document by FAX.

The FAX data management unit 23 has the functions of the document management unit 11 and the state management unit 15. That is, the FAX data management unit 23 stores the document received by the FAX receiving unit 22 in the storage unit 16. In addition, the FAX data management unit 23 sets the state of the document to unread when the document is stored in the storage unit 16. The FAX data management unit 23 sets the state of the document to already read on the condition that the output of all pages of the document is completed.

Note that in the second embodiment, printing is given as an example of output.

The FAX data management unit 23 uses a FAX data management table 181 to manage the state of each document in the storage unit 16. The FAX data management table 181 is stored in the storage unit 16, and the FAX data management unit 23 can refer to or update the FAX data management table 181 in the storage unit 16. Note that the specific configuration of the FAX data management table 181 will be described later.

In addition, the MFP 1a also includes a print job management unit 31 and a print control unit 32. The functions of the print job management unit 31 and the print control unit 32 are realized by causing, for example, the CPU 101 to execute a print application 190. As with each functional component of the first embodiment, some or all of the functions of the print job management unit 31 and the print control unit 32 can be realized by one or a plurality of processing circuits.

The print control unit 32 includes the function of the output control unit 12 (more accurately, the function of controlling the printing of the output control unit 12). The print control unit 32 controls the printing of the document by using the printer unit 132.

The print job management unit 31 has a function of managing the print job and a function as the state acquisition unit 13 and the output result determining unit 14.

Specifically, the print job management unit 31 treats each of the printing instructions as a print job when printing is instructed. The print job management unit 31 registers one or more print jobs in a print job management table 191 and manages the execution state of each print job registered in the print job management table 191. The execution state of the print job is described as a processing state. The processing state can take any of a plurality of states, including waiting for printing, in print, and printing completion.

In addition, the print job management unit 31 acquires the number of pages, which has been output, from the document specified as a print target. Specifically, the print job management unit 31 counts the number of pages for which the paper ejection is completed as the number of pages which has been output. Then, the print job management unit 31 determines whether or not the output of all pages of the document specified as the print target is completed based on the acquired number of pages. The print job management unit 31 notifies the FAX data management unit 23 of the determination result.

FIG. 8 is a schematic diagram illustrating an example of a data structure of the FAX data management table 181 according to the second embodiment. As illustrated in FIG. 8, the FAX data management table 181 has a structure of a table that includes fields in which each item of document ID, received date and time, destination, the number of pages, an unread status, a file path, a job ID, and a job status is recorded.

A number (that is, document ID) for uniquely identifying the received document is recorded in the field of the document ID. The date and time when reception starts is recorded in the field of the received date and time. Information representing a device of a transmission source of the document is recorded in the field of the destination. For example, the FAX number is recorded in the field of the destination. The number of pages constituting the document is recorded in the field of the number of pages. The state of the document, that is, for example, whether the state of the document is unread or already read is recorded in the field of the unread status. The file path indicating the storage location of the document is recorded in the field of the file path. When printing, distribution, or the like is instructed, a number (that is, job ID) for uniquely identifying a job having the instructed contents is recorded in the job ID. The state relating to the execution of the job relating to the processing of the document is recorded in the field of the job status.

The job state can take one of, for example, under print instruction, printing completion, or printing failure. Regarding the job state, the under print instruction is a state in which the execution of the print job is instructed and the execution of the print job is waiting to be completed. In addition, the printing completion is a state in which the paper ejection of all pages constituting the document is completed. That is, the printing completion is a state in which the printing succeeds. In addition, the printing failure is a state in which the execution of the print job is completed without performing the paper ejection of some or all of the pages constituting the document.

According to the example in FIG. 8, information about five documents given document IDs from 0001 to 0005 is registered in the FAX data management table 181. It can be read that a document with a document ID of 0001 is composed of six pages, a document with a document ID of 0002 is composed of five pages, a document with a document ID of 0003 is composed of three pages, a document with a document ID of 0004 is composed of 10 pages, and a document with a document ID of 0005 is composed of two pages. The states of these five documents are all in the unread state.

The user can check the state of the document accumulated in the storage unit 16 by inputting an instruction to display a list of documents from the operation panel 140 or the like. When the instruction is input, the FAX operation display unit 21 generates a screen displaying the state of one or more documents accumulated in the storage unit 16 based on the FAX data management table 181 and displays the generated screen on the panel display unit 140*a*.

FIG. 9 is a schematic diagram illustrating an example of a screen displayed by the FAX operation display unit 21 according to the second embodiment.

According to the example illustrated in FIG. 9, a screen 141 includes an area 141*a* in which information on one or more documents is displayed. Here, the information on the documents with the document IDs from 0001 to 0004 is displayed in the area 141*a*. The information on each document includes received date and time, transmission source, copy, and state (unread or already read). The transmission source is information described in the field of the destination of the FAX data management table 181, and the copy is information described in the field of the number of pages of the FAX data management table 181.

Note that the screen 141 includes an area 141*b* into which instructions can be input. A document transmission button 142 and a document printing button 143 are drawn in the area 141*b*, and a user can touch and operate these buttons.

When the user selects a document from the area 141*a* and touches the document transmission button 142, a setting screen setting a transmission destination is displayed by the FAX operation display unit 21. The user can set one or a plurality of transmission destinations such as a Fax number, a folder, an e-mail address, and a cloud storage as a transmission destination via the setting screen. The setting screen includes a start key, and when the user touches the start key, the transmission of the selected document starts.

When the user selects a document from the area 141*a* and touches the document printing button 143, the setting screen setting the printing condition such as both sides and aggregation is displayed by the FAX operation display unit 21. The user can set the print conditions via the setting screen. The setting screen includes a start key, and when the user touches the start key, the printing starts.

Note that the FAX operation display unit 21 may be configured so that the screen 141 illustrated in FIG. 9 can be displayed on a display device of an external device such as a PC 7 to receive an operation input from the PC 7 or the like.

FIGS. 10A to 10C are schematic diagrams illustrating an example of a data structure of the print job management table 191 according to the second embodiment. Here, it is assumed that the user has input the printing instructions of three documents with the document IDs 0001, 0003, and 0004.

As illustrated in FIGS. 10A to 10C, the print job management table 191 has a structure of a table that includes fields in which each item of a job ID, the total number of pages, the number of printed pages, and the processing state is recorded. The job ID is recorded in the field of the job ID. The number of pages constituting the document is recorded in the field of the total number of pages. The number of pages for which the paper ejection is completed, which is acquired by the print job management unit 31, is recorded in the field of the number of printed pages. The execution state of the job is recorded in the field of the processing status.

Here, as an example, the processing state can take any of waiting for printing, in print, and printing completion. Regarding the processing state, the waiting for printing is a state in which the execution of the print job is instructed, but the execution of the print job is waiting to start. The in print is the state in which the print job is being executed. The printing completion is the state in which the execution of the print job is completed. Note that in the processing state, unlike the job state, the printing is completed when the execution of the print job is completed regardless of whether the paper ejection of all pages is completed.

For example, when the print job management unit 31 registers a print job in response to an instruction from the FAX data management unit 23, the processing state of the print job is set to the waiting for printing. When the print control unit 32 starts to execute the print job, the print job management unit 31 sets the processing state of the print job to the in print. When the processing state is in print, the print job management unit 31 monitors the number of pages for which the paper ejection is completed and updates the recording of the item of the number of pages for which the paper ejection is completed in real time. When receiving the notification of the end of execution of the print job from the print control unit 32, the print job management unit 31 sets the processing state to the printing completion. Then, the print job management unit 31 determines whether or not the number of pages for which the paper ejection is completed matches the total number of pages. If the number of pages for which the paper ejection is completed matches the total number of pages, the print job management unit 31 determines that the printing succeeds. If the number of pages for which the paper ejection is completed does not match the total number of pages, the print job management unit 31 determines that the printing fails. The print job management unit 31 notifies the FAX data management unit 23 of the determination result.

For example, FIG. 10A illustrates the print job management table 191 immediately after the print instruction of three documents with document IDs 0001, 0003, and 0004. As illustrated in FIG. 10A, a print job of the document with the document ID of 0001 is assigned 0001 as a job ID, a print job of the document with the document ID of 0003 is assigned 0002 as a job ID, and a print job of the document with the document ID of 0004 is assigned 0003 as a job ID. Then, the same information as the information recorded in the field of the number of pages of the FAX data management table 181 is recorded in the field of the total number of pages.

From the print job management table 191 illustrated in FIG. 10A, it can be read that the processing state of the print job with the job ID of 0001 is being printed and the paper ejection (that is, printing) of two pages out of the document of six pages with the document ID 0001 is completed. In addition, the processing states of the print job with the job IDs of 0002 and 0003 are both the waiting for printing.

The print job management table 191 transitions from the state illustrated in FIG. 10A to, for example, the state illustrated in FIG. 10B. According to the print job management table 191 illustrated in FIG. 10B, the processing state of the print job with the job ID of 0001 is the printing completion. It can be read that the printing of the document succeeds because the paper ejection of six pages out of the document of six pages with the document ID 0001 for the print job is completed.

In addition, according to the print job management table 191 illustrated in FIG. 10B, the processing state of the print job with the job ID of 0002 is the in print. Then, it can be read that the paper ejection of one page out of the document of three pages with the document ID 0003 for the print job with the job ID of 0001 is completed. The processing state of the print job with the job ID of 0003 is the waiting for printing.

The print job management table 191 transitions from the state illustrated in FIG. 10B to, for example, the state illustrated in FIG. 10C. According to the FAX data management table 181 illustrated in FIG. 10C, the processing state of the print job with the job ID of 0002 is set to the printing failure, and the processing state of the print job with the job ID of 0003 is the in print. Regarding the document for the print job with the job ID of 0002, it can be read that only two out of three pages are paper ejected, and the printing in which the paper ejection (that is, printing) of the remaining one page is not completed ends.

FIG. 11 is a schematic diagram illustrating an example of a data structure of the FAX data management table 181 according to the second embodiment at a timing when the state of the print job management table 191 is in the state illustrated in FIG. 10C.

As described above, the print job of the document with the document ID of 0001 is assigned 0001 as the job ID, the print job of the document with the document ID of 0003 is assigned 0002 as the job ID, and the print job of the document with the document ID of 0004 is assigned 0003 as the job ID. Therefore, 0001 is recorded in the field of the job ID of the information related to the document with the document ID of 0001, 0002 is recorded in the field of the job ID of the information related to the document with the document ID of 0003, and 0003 is recorded in the field of the job ID of the information related to the document with the document ID of 0004.

Further, at the timing when the state of the print job management table 191 is in the state illustrated in FIG. 10C, since the processing state of the print job with the job ID of 0001 is the printing completion and is determined to be the printing success, the printing completion is recorded in the field of the job state of the information related to the document with the document ID of 0001, which is specified as a print target by the print job. The already read is recorded in the field of the unread status.

At the above timing, the print job with the job ID of 0002 is determined to be the printing failure. Therefore, the printing failure is recorded in the field of the job status which is the state related to the document with the document ID of 0003, which is specified as a print target by the print job. Then, instead of the already read, the unread is recorded in the field of the unread status.

Further, at the above timing, since the execution of the print job with the job ID of 0003 has not been completed yet, the under print instruction is recorded in the field of the job status related to the document with the document ID of 0004, which is specified as the print target by the print job. Then, instead of the already read, the unread is recorded in the field of the unread status.

Note that as described above, the user can know the information on the field of the unread status of the FAX data management table 181 by calling the screen 141.

Figure 12:
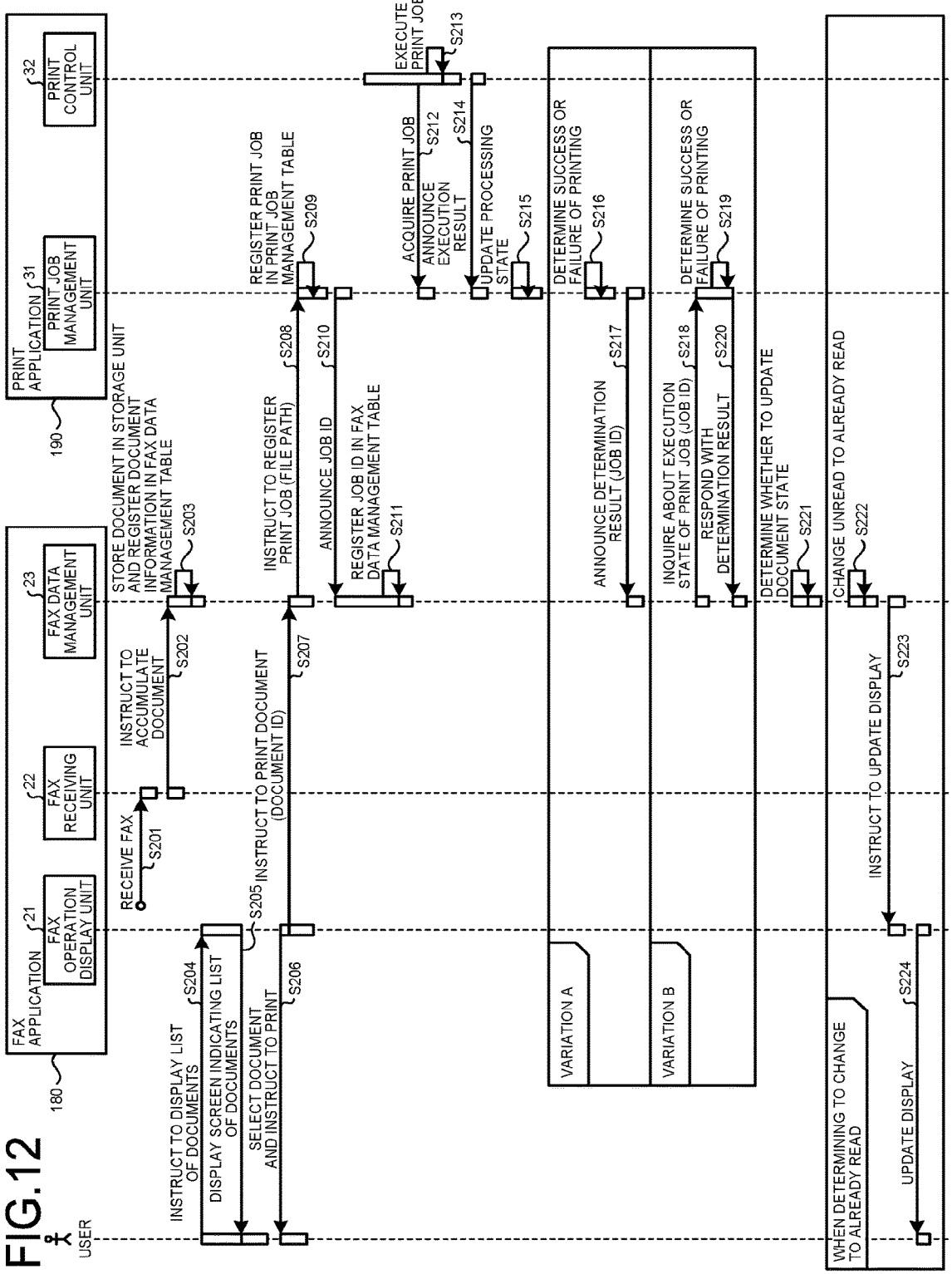
FIG. 12 is a sequence diagram illustrating an example of an operation of the MFP according to the second embodiment.

FIG. 12 is a sequence diagram illustrating an example of an operation of the MFP 1a according to the second embodiment.

First, when there is a FAX reception (S201), the FAX receiving unit 22 instructs the FAX data management unit 23 to accumulate the documents received by the FAX (S202). The FAX data management unit 23 stores the instructed document in the storage unit 16 and registers the information on the document in the FAX data management table 181 (S203). As described above, the information registered in the FAX data management table 181 includes items such as the document ID, the received date and time, the destination, the number of pages, the unread status, the file path, the job ID, and the job status. In S203, the FAX data management unit 23 records unread in the field of the unread status. In addition, the FAX data management unit 23 leaves the job ID and the job state blank. The FAX data management unit 23 records a number assigned in some way in the field of the document ID. For example, the FAX receiving unit 22 or the FAX data management unit 23 may assign the number of the document ID to each document in ascending order of reception.

Note that processing S201 to S203 constitutes a FAX reception/accumulation phase. The FAX reception/accumulation phase is executed at the timing when the document is received by FAX.

The user can input an instruction to display a list of documents by, for example, operating the operation panel 140 (S204). When the instruction is input, the FAX operation display unit 21 generates a screen displaying a list of documents accumulated in the storage unit 16 as illustrated in FIG. 8, for example, and displays the generated screen on the panel display unit 140a (S205).

The user can select a document from the displayed screen and input a print instruction (S206). The input print instruction is transmitted to the FAX data management unit 23 by the FAX operation display unit 21 (S207).

Note that the print instruction transmitted to the FAX data management unit 23 includes the document ID indicating the selected document. In the description of FIG. 12, the document selected as the print target by S206 is described as the target document.

When receiving the printing instruction, the FAX data management unit 23 instructs the print job management unit 31 to register a print job for printing the target document (S208). The instruction to register the print job includes the file path.

When receiving the instruction to register the print job, the print job management unit 31 registers the information related to the printing of the target document in the print job management table 191 (S209).

The information registered in the print job management table 191 includes items such as the job ID, the total number of pages, the number of printed pages, and the processing status, as described above. The print job management unit 31 generates and records the job ID in some way. For example, the print job management unit 31 may generate an ascending number each time the registration of the print job is instructed, and use the generated number as the job ID. Further, for example, in S208, the print job management unit 31 receives the notification of the number of pages constituting the target document from the FAX data management unit 23, and records the notified number of pages as the total number of pages. The print job management unit 31 records zero as the number of printed pages and leaves the field of the processing status blank.

When the registration of the print job is completed, the print job management unit 31 returns the job ID to the FAX data management unit 23 (S210). Then, the FAX data management unit 23 registers the received job ID in the field of the job ID of the information on the target document in the FAX data management table 181 (S211).

The print control unit 32 can acquire and execute the print jobs registered in the print job management table 191 in order. When acquiring the print job for printing the target document (S212), the print control unit 32 executes the print job (S213). The print control unit 32 controls the printer unit 132 to attempt the printing of the target document.

When the execution of the print job ends, the print control unit 32 notifies the print job management unit 31 of the execution result (S214). Note that the execution of the print job can be terminated not only when printing is completed normally, but also when the printing cancellation, the paper out, or the paper jam occurs. In S214, it is notified that the execution of the print job is terminated.

The print job management unit 31 monitors the number of pages for which the paper ejection has been completed while the print job is being executed, and updates the recording of the items of the number of printed pages in the print job management table 191 in real time. When receiving the notification that the execution of the print job ends, the print job management unit 31 updates the print job management table 191 in response to the notification (S215). Specifically, the print job management unit 31 sets the recording of the item of the processing status to the printing completion.

Note that the print job management unit 31 may not execute the monitoring of the number of pages for which the paper ejection is completed in real time. When receiving the notification that the print job is completed by the processing S214, the print job management unit 31 may acquire the number of pages for which the paper ejection is completed.

Subsequently, the print job management unit 31 determines whether or not the printing succeeds (S216). That is, the print job management unit 31 compares the recording of the item of the total number of pages with the updated recording of the item of the number of printed pages. If the recording of the item of the total number of pages and the updated recording of the item of the number of printed pages are equivalent, the print job management unit 31 determines that the printing succeeds. If the recording of the item of the total number of pages and the updated recording of the item of the number of printed pages are not equivalent, the print job management unit 31 determines that the printing fails.

Then, the print job management unit 31 notifies the FAX data management unit 23 of the determination result (S217). The notification of the determination result may include the job ID.

The processing S216 and S217 described here is one of a plurality of variations (variation A). According to another variation (variation B), for example, the FAX data management unit 23 specifies the job ID and inquires of the print job management unit 31 about the execution state of the print job (S218). The print job management unit 31 determines whether or not the printing succeeds if the execution of the print job ends when receiving the inquiry (S219). That is, the print job management unit 31 executes the same processing as S216. Then, the print job management unit 31 notifies the FAX data management unit 23 of the determination result (S220). In this way, the FAX data management unit 23 may perform polling to the print job management unit 31 for notification of the determination result.

When receiving the determination result as to whether the printing succeeds by the processing S217 or S220, the FAX data management unit 23 updates the recording of the field of the job status of the FAX data management table 181 and determines whether to update the recording of the field of the unread status of the FAX data management table 181 (S221).

For example, when receiving the determination result that the printing succeeds, the FAX data management unit 23 changes the recording of the field of the unread status to the already read (S222). Then, the FAX data management unit 23 transmits an instruction to update the display to the FAX operation display unit 21 (S223). When receiving the instruction, the FAX operation display unit 21 changes the display of the state related to the target document in the screen from the unread to the already read, and displays the changed screen on the panel display unit 140a (S224).

For example, when receiving the determination result that the printing fails, the FAX data management unit 23 keeps the recording of the field of the unread status unread.

In this way, the functions as the document management unit 11, the output control unit 12, the state acquisition unit 13, the output result determining unit 14, and the state management unit 15 can be separately implemented for the FAX application 180 and the print application 190.

Note that the method of dividing the functions as the document management unit 11, the output control unit 12, the state acquisition unit 13, the output result determining unit 14, and the state management unit 15 is not limited to the method described above.

In one example, the function as the output result determining unit 14 may be provided in the FAX application 180. For example, the print job management unit 31 has a function as the state acquisition unit 13, and the FAX data management unit 23 has the function as the output result determining unit 14. FIG. 13 is a schematic diagram illustrating an example of the data structure of the print job management table 191 according to the second embodiment in this case. As illustrated in FIG. 13, the print job management table 191 has a structure of a table that includes fields in which each item of a job ID, the number of printed pages, and the processing status is recorded. The print job management unit 31 acquires the number of pages for which the paper ejection is completed in real time, and updates the recording of the number of printed pages with the acquired number. Then, when the processing state becomes the printing completion, the print job management unit 31 transmits the recording of the number of printed pages at that time to the FAX data management unit 23. Note that the print job management unit 31 does not acquire the number of pages for which the paper ejection is completed in real time, and when the processing state becomes the printing completion, the print job management unit 31 may acquire the number of pages for which the paper ejection is completed and transmit the acquired number of pages to the FAX data management unit 23. The FAX data management unit 23 determines whether or not the printing succeeds based on whether or not the number of pages constituting the document matches the number of printed pages received.

In addition, a plurality of job types may be provided. FIG. 14 is a schematic diagram illustrating yet another example of the data structure of the print job management table 191 according to the second embodiment. As illustrated in FIG. 14, the print job management table 191 has an additional field in which items of a job type and an item of a notification application are recorded. In FIG. 14, as an example, three jobs with job types of normal printing, manual printing of a FAX accumulation document, and copy printing are registered.

The job of the normal printing is a job that prints a document created by the PC 7 or the like, not a document received by FAX. The job of the manual printing of the FAX accumulation document is a job of printing the document accumulated in the storage unit 16 according to the operation of the operation panel 140 by the user. The job of the copy printing is a job that prints a document read by the scanner unit 131 according to the manual operation by the user.

Then, the job of the manual printing of the FAX accumulation document is associated with the FAX application as the notification application. That is, the state of the job of the manual printing of the FAX accumulation document is notified to the FAX application 180. The state of other types of jobs that are not associated with the FAX application as the notification application is not notified to the FAX application 180.

In this way, the print job may include a plurality of types.

Further, in the above description, printing a document is described as an example of the output of the document received by FAX. Not only when the document is printed, but also when the document is delivered or when the document is transmitted by FAX, the technology related to the embodiment that sets the state of the document to the already read on the condition that the output of all pages is completed can be applied.

For example, a delivery application that delivers the document accumulated in the storage unit 16 is operating by the MFP 1. The FAX application 180 is linked with the delivery application. Specifically, the FAX application 180 sets the state of the document to the already read when the delivery of the document is instructed and the delivery of all pages of the document is completed.

In another example, the FAX application 180 has the function of transmitting the document accumulated in the storage unit 16 by FAX. The FAX application 180 sets the state of the document to the already read when the transmission of the document by FAX is instructed and the transmission of all pages of the document is completed.

Note that in the present embodiment, the state management unit 15 of the FAX data management unit 23 has been described as setting the state of the document to the already read on the condition that the output of all pages of the document is completed, but this is not limitative.

Figure 15:
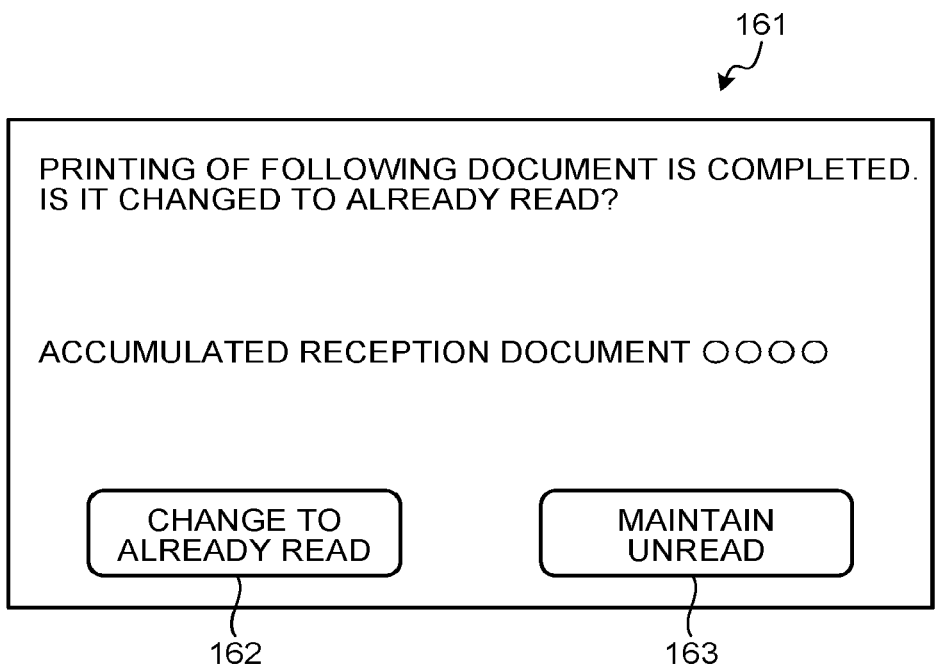
FIG. 15 is a diagram illustrating a modified example of the second embodiment.

Here, FIG. 15 is a diagram illustrating a modified example of the second embodiment. As illustrated in FIG. 15, the state management unit 15 of the FAX data management unit 23 may allow the operation panel 140 to display a pop-up screen 161 on the operation panel 140 for a user to shift to the already read via the FAX operation display unit 21 when the output of all pages of the document is completed, and allow the user to set whether to set the document state to the already read. As illustrated in FIG. 15, a button 162 for changing the state of the document to the already read, and a button 163 for leaving the state of the document unread are displayed on the pop-up screen 161, in addition to the fact that all the output of the document is completed. Then, the state management unit 15 of the FAX data management unit 23 changes the recording of the field of the unread status to the already read when the user selects and operates the button 162 of the pop-up screen 161, as illustrated in FIG. 9. On the other hand, the state management unit 15 of the FAX data management unit 23 keeps the recording of the field of the unread status unread when the user selects and operates the button 163 of the pop-up screen 161.

Third Embodiment

Some of functions as a document management unit 11, an output control unit 12, a state acquisition unit 13, an output result determining unit 14, and a state management unit 15 may be provided in other devices of an MFP.

Figure 16:
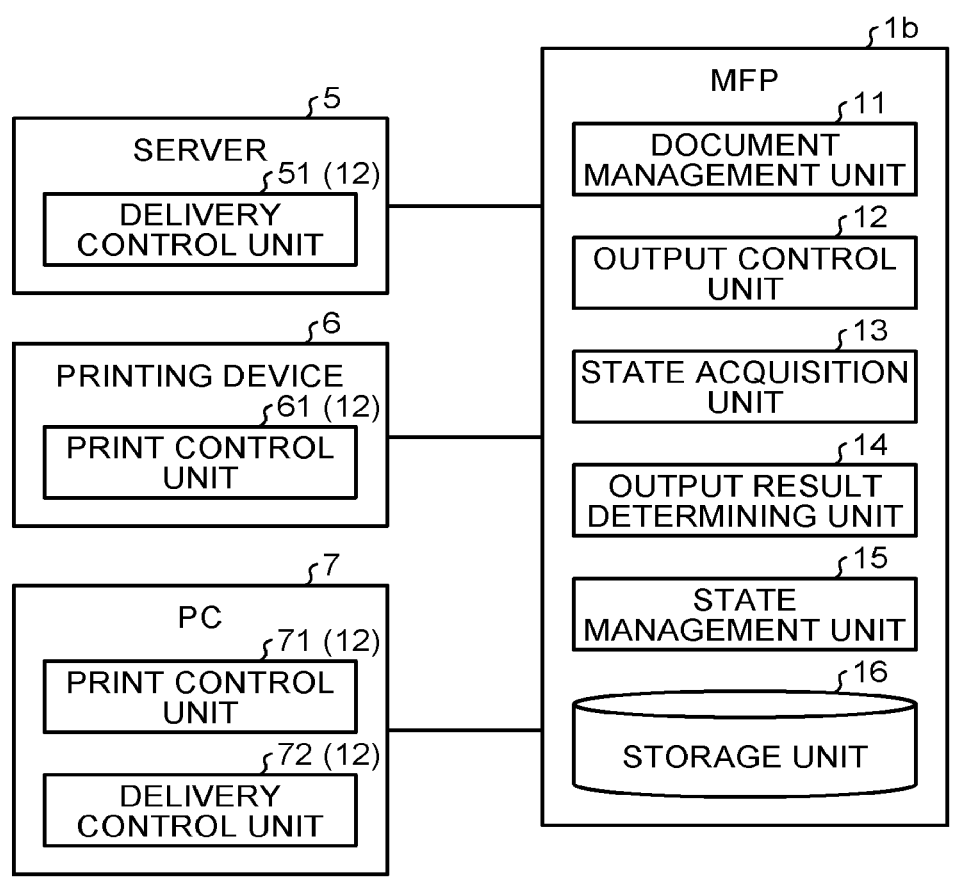
FIG. 16 is a diagram illustrating an example of a configuration of a system to which an information processing apparatus according to a third embodiment is applied.

FIG. 16 is a diagram illustrating an example of a configuration of a system to which an information processing apparatus according to a third embodiment is applied. As illustrated in FIG. 16, an MFP 1b has the same functional configuration as the MFP 1 according to the first embodiment. In addition, a server 5 includes a delivery control unit 51 that can deliver the documents accumulated in a storage unit 16. In addition, a printing device 6 includes a print control unit 61 that can print the documents accumulated in the storage unit 16. In addition, a PC 7 includes a print control unit 71 that can print the document accumulated in the storage unit 16 and a delivery control unit 72 that can deliver the documents accumulated in the storage unit 16.

The delivery control unit 51, the print control unit 61, the print control unit 71, and the delivery control unit 72 correspond to the output control unit 12 provided in the device other than the MFP 1b.

In the MFP 1, the state acquisition unit 13 acquires the number of pages that have been output (paper ejection in the case of printing) by the delivery control unit 51, the print control unit 61, the print control unit 71, the delivery control unit 72, and the like. Then, the output result determining unit 14 determines whether or not the output (paper ejection in the case of printing) of all pages of the document is completed based on the number of pages for which the acquired output (paper ejection in the case of printing) has been completed. Then, the state management unit 15 sets the state of the document to already read based on the determination result. More specifically, the state management unit 15 sets the state of the document to already read on the condition that the output (paper ejection in the case of printing) of all pages of the document is completed.

Note that the state acquisition unit 13, the output result determining unit 14, and the like may be provided in a device other than the MFP 1, in addition to the output control unit.

In addition, the information processing apparatus having the MFP 1 that includes the document management unit 11, the output control unit 12, the state acquisition unit 13, the output result determining unit 14, and the state management unit 15 may be applied to a FAX server that acquires and manages the document received by the FAX receiving device. That is, the functions of the MFPs 1 and 1a of the first and second embodiments can be applied to devices other than the MFPs 1 and 1a.

Fourth Embodiment

Next, a fourth embodiment will be described.

In the first to third embodiments, the description assumes that the document processing such as the printing is performed by the MFP 1 alone, but in the fourth embodiment, a case where a plurality of devices is linked to perform document processing, such as a FAX linkage function, will be described. Note that the FAX linkage function is a function of linking a device (hereinafter referred to as a slave unit) that is not connected to a FAX line and a device (hereinafter referred to as a master unit) that is connected to the FAX line to cause even the device that is not connected to the FAX line to perform FAX transmission and reception. Hereinafter, in the description of the fourth embodiment, description of the same parts as those of the first to third embodiments will be omitted, and the parts different from the first to third embodiments will be described.

In the present embodiment, in managing unread of a FAX received document in a FAX linkage system, it aims to perform the unread management of the document based on not only the operation of the document but also the execution result of the document processing performed in the device by the operation, and not only the execution result when viewed from the device alone but also the execution result of the entire FAX linkage system.

Figure 17:
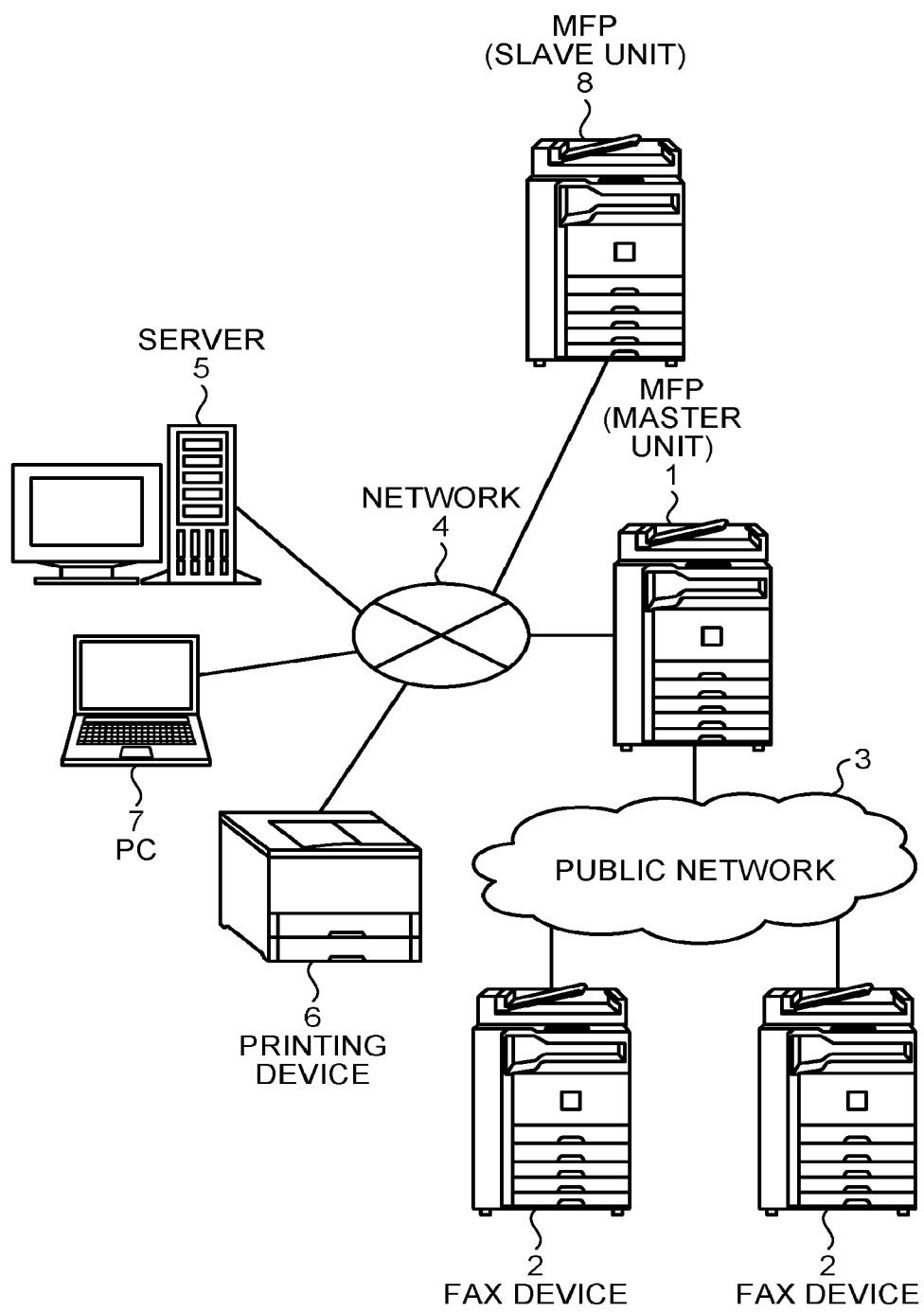
FIG. 17 is a schematic diagram illustrating an example of a system configuration in a FAX linkage system according to a fourth embodiment.

FIG. 17 is a schematic diagram illustrating an example of a system configuration in the FAX linkage system according to the fourth embodiment. The FAX linkage system illustrated in FIG. 17 functions as an information processing system, and links the MFP 1 to which the FAX line is connected as a master unit and an MFP 8 to which the FAX line is not connected as a slave unit to perform the FAX transmission and reception even with the MFP 8 which is another information processing apparatus to which the FAX line is not connected.

Note that since the hardware configuration of the MFP 8 is not different from the hardware configuration of the MFP 1 described in FIG. 2, the description thereof will be omitted.

Here, the FAX linkage function in the FAX linkage system of the present embodiment will be described briefly.

The MFP 1 (master unit: a first information processing apparatus) receives a document from the FAX device 2 connected via the public network 3 and accumulates the received document in a storage device such as the HD 109.

A user of the MFP 1 (master unit) can select the accumulated document (FAX received document) from an operation panel 140 or a browser and perform processing such as display, printing, transmission, and erasing. In addition, the printing (manual/automatic) with the previously registered MFP 8 (slave unit: a second information processing apparatus) can also be performed.

In addition, the MFP 1 (master unit) manages whether the document (FAX received document) has not been processed yet (hereinafter, unread) or has been processed (hereinafter, already read), and the user of the MFP 1 (master unit) can check the information on the operation panel 140.

Figure 18:
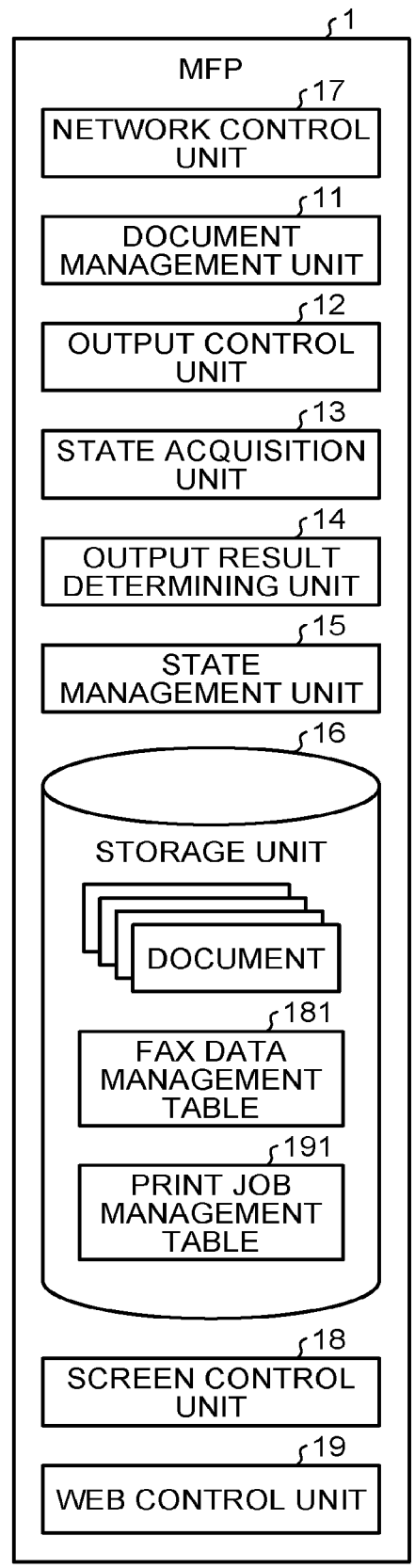
FIG. 18 is a schematic diagram illustrating an example of a function configuration of an MFP (master unit) according to the fourth embodiment.

FIG. 18 is a schematic diagram illustrating an example of a function configuration of the MFP 1 (master unit) according to the fourth embodiment.

As illustrated in FIG. 18, the MFP 1 further includes a network control unit 17, a screen control unit 18, a Web control unit 19, in addition to the above-mentioned document management unit 11, output control unit 12, state acquisition unit 13, output result determining unit 14, state management unit 15, and storage unit 16.

The network control unit 17 performs transmission of a document (FAX received documents) accumulated in the storage unit 16 such as the HD 109 to the server 5, or performs transmission and print instruction of the document (FAX received document) to the MFP 8 (slave unit).

Further, as described above, the storage unit 16 includes a FAX data management table 181 used by the FAX data management unit 23 and a print job management table 191 managed by the print job management unit 31.

The screen control unit 18 provides a UI for displaying the contents/unread status of the document accumulated in the storage unit 16 and performing operations such as printing/transmission/deleting from the operation panel 140 of the MFP 1.

The Web control unit 19 provides a UI for collecting the documents accumulated in the storage unit 16 from a Web browser, in addition to the functions provided by the screen control unit 18.

Figure 19:
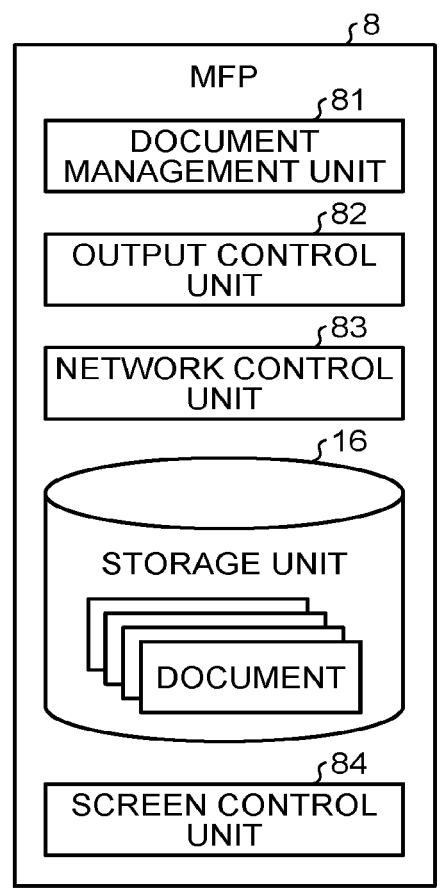
FIG. 19 is a schematic diagram illustrating an example of a function configuration of an MFP (slave unit) according to the fourth embodiment.

FIG. 19 is a schematic diagram illustrating an example of a function configuration of the MFP 8 (slave unit) according to the fourth embodiment.

As illustrated in FIG. 19, the MFP 8 includes a document management unit 81, an output control unit 82, a network control unit 83, and a screen control unit 84.

The document management unit 81 functions as a second document management unit. The document management unit 81 accumulates/manages the documents transmitted from the MFP 1 (master unit) in the storage unit 16. In addition, the document management unit 81 sets the state of the document to the already read on the condition that the output of all pages of the document transmitted from the MFP 1 (master unit) and accumulated in the storage unit 16 is completed.

The output control unit 82 controls the output of the document accumulated in the storage unit 16.

The network control unit 83 receives the document (FAX received document) transmitted from the MFP 1 (master unit) and transmits the document that requests the MFP 1 (master unit) to perform FAX transmission.

The screen control unit 84 provides a UI for displaying the print state from the operation panel 140 of the MFP 8 and performing various operations such as a FAX transmission request to the MFP 1 (master unit).

Next, the data managed in the storage unit 16 included in the MFP 1 (master unit) will be described.

FIG. 20 is a schematic diagram illustrating an example of a data structure of the FAX data management table 181 according to the fourth embodiment. The FAX data management table 181 manages the data displayed on the accumulated reception document screen described later. As illustrated in FIG. 20, the FAX data management table 181 has a structure of a table that includes a field in which each item of document ID, received date and time, destination, the number of pages, and an unread status is recorded.

A number (that is, document ID) for uniquely identifying the received document is recorded in the field of the document ID.

The date and time when reception starts is recorded in the field of the received date and time.

The information representing the device of the transmission source of the document notified from the destination or the public network 3 is recorded in the field of the destination. For example, the FAX number is recorded in the field of the destination.

The number of pages constituting the document is recorded in the field of the number of pages.

The state of the document, that is, for example, whether the state of the document is unread or already read is recorded in the field of the unread status.

According to the example in FIG. 20, information on three documents given document IDs from 1001 to 1003 is registered in the FAX data management table 181. Then, for example, the state of the document with the document ID of 1001 is the unread state, the state of the document with the document ID of 1002 is a holding state, and the state of the document with the document ID of 1003 is a holding state.

FIG. 21 is a schematic diagram illustrating an example of a data structure of the print job management table 191 according to the fourth embodiment. Note that it is assumed that the user has input the printing instructions of four documents with the document IDs 0001, 0002, 0003, and 0004. The print job management table 191 manages various data of jobs operating by the MFP 1 (master unit).

As illustrated in FIG. 21, the print job management table 191 has a structure of a table including fields in which each item of a job ID, a job type, a processing target, a document ID, and a processing status is recorded.

In the field of the job ID, the job ID, which is a number for uniquely identifying the job, is recorded.

The information indicating the job type to be operated is recorded in the field of the job type. Examples of the job type include "accumulated document manual printing (own machine)", "accumulated document manual printing (slave unit)", "document transmission", "report printing", and the like. The "accumulated document manual printing (own machine)" indicates that the document has been printed with the MFP 1 (master unit). The "accumulated document manual printing (slave unit)" indicates that the transmission of the document to the MFP 8 (slave unit) and the instruction of printing the document have been performed. The "document transmission" indicates that the document has been transmitted to the server 5. The "report printing" indicates that the processing report has been printed by the MFP 1 (master unit).

In the field of the processing target, information on the device that is the target of the job is recorded, and in the case of printing with the slave unit, the information of the MFP 8 (slave unit) for which the print instruction has been issued, is recorded.

A number (that is, document ID) that represents the document that is the target of the job and uniquely identifies the received document is recorded in the field of the document ID. That is, it is the same as the document ID managed by the FAX data management table 181.

The document ID is data managed by both the FAX data management table 181 and the print job management table 191 and is data that connects both tables. When the job related to the accumulated document (FAX received document) is completed, the row of print job management table 191 with the same document ID is also updated as needed.

The execution state of the job is recorded in the field of the processing status.

Here, as an example, the processing state can acquire any of waiting for printing, in print, and printing completion. Regarding the processing state, the waiting for printing is a state in which the execution of the print job is instructed, but the execution of the print job is waiting to start. The in print is the state in which the print job is being executed. The printing completion is the state in which the execution of the print job is completed. Note that in the processing state, unlike the job state, the printing is completed when the execution of the print job is completed regardless of whether the paper ejection of all pages is completed.

Next, the screen displayed by the FAX operation display unit 21 of the MFP 1 (master unit) according to the fourth embodiment will be described.

Here, FIG. 22 is a schematic diagram illustrating an example of a screen displayed by the FAX operation display unit 21. According to the example illustrated in FIG. 22, a screen 141 includes an area 141a in which information on one or more documents is displayed. Here, the information on the documents with the document IDs from 0001 to 0004 is displayed in the area 141a. The information on each document includes received date and time, transmission source, copy, and check state (unread or already read) of a document. The transmission source is information described in the field of the destination of the FAX data management table 181, and the copy is information described in the field of the number of pages of the FAX data management table 181.

Note that the screen 141 includes an area 141b into which instructions can be input. A document transmission button 142, an own machine document printing button 144, a slave unit document printing button 145 are drawn in the area 141b, and a user can touch and operate these buttons.

When the user selects a document from the area 141a and touches the document transmission button 142, a setting screen setting a transmission destination is displayed by the FAX operation display unit 21. The user can set one or a plurality of transmission destinations such as a Fax number, a folder, an e-mail address, and a cloud storage as a transmission destination via the setting screen. The setting screen includes a start key, and when the user touches the start key, the transmission of the selected document starts.

When the user selects a document from the area 141a and touches the own machine document printing button 144, the setting screen setting the printing condition such as both sides and aggregation is displayed by the FAX operation display unit 21. The user can set the print conditions via the setting screen. The setting screen includes a start key, and when the user touches the start key, the printing starts.

When the user selects a document from the area 141a and touches the slave unit document printing button 145, the setting screen 151 (see FIG. 23) setting the MFP 8 (slave unit) to be processed is displayed by the FAX operation display unit 21. Here, FIG. 23 is a diagram illustrating an example of the setting screen 151. As illustrated in FIG. 23, the setting screen 151 displays a list of the MFPs 8 (slave units) that can be set as the processing target. The user can set the MFP 8 (slave unit), which is one or a plurality of transmission destinations as a transmission destination, via the setting screen 151. The setting screen 151 includes a start key 152, and when the user touches the start key 152 after setting the MFP 8 (slave unit) to be processed, the transmission of the selected document starts.

Next, the operation of each part in the FAX linkage system will be described.

Figure 24:
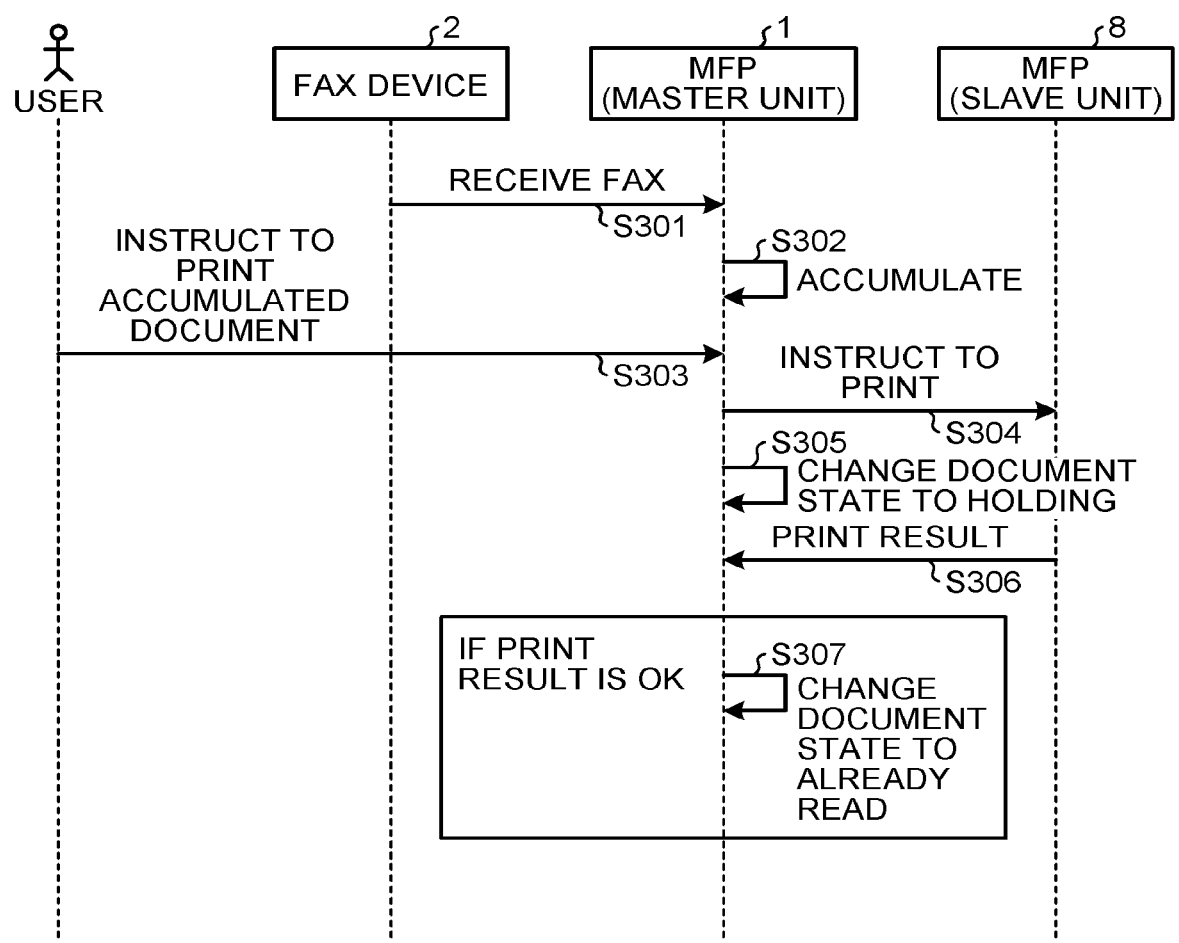
FIG. 24 is a sequence diagram illustrating an example of an operation according to the fourth embodiment.

FIG. 24 is a sequence diagram illustrating an example of an operation according to the fourth embodiment. As illustrated in FIG. 24, when there is a FAX reception from the FAX device 2 (S301), the MFP 1 (master unit) stores the accumulation of documents received by FAX in the storage unit 16 and registers the information on the document in the FAX data management table 181 and the print job management table 191 (S302).

As described above, the information registered in the FAX data management table 181 includes items such as the document ID, the received date and time, the destination, the number of pages, and the unread status. In S302, the FAX data management unit 23 of the MFP 1 (master unit) records "unread" in the field of the unread status.

The information registered in the print job management table 191 includes items such as the job ID and the job type as described above. In S302, the FAX data management unit 23 of the MFP 1 (master unit) leaves the job ID and the job type blank. The FAX data management unit 23 of the MFP 1 (master unit) records the document ID in the field of the document ID.

When the user selects a document from the area 141a of the screen 141 illustrated in FIG. 24, and touches the slave unit document printing button 145, and the MFP 8 (slave unit) to be processed is set, assuming that there is the print instruction to the MFP 8 (slave unit) (step S303), the MFP 1 (master unit) registers the job ID, the job type, the processing target, the document ID, and the processing state in the print job management table 191 and instructs the MFP 8 (slave unit) to be processed to print (S304).

For example, as illustrated in FIG. 21, the MFP 1 (master unit) registers a job ID "0002", a job type "accumulated document manual printing (slave unit)", a processing target "1st floor west", a document ID "1003" and processing state "executing" in the print job management table 191.

In addition, the FAX data management unit 23 of the MFP 1 (master unit) changes the field of the unread status of the FAX data management table 181 from the "unread" state to the "holding" state when the above printing operation is performed (S305).

Thereafter, the MFP 1 (master unit) receives the print result from the MFP 8 (slave unit) (S306).

When the printing operation by the MFP 8 (slave unit) is completed normally and the print result=OK is received from the MFP 8 (slave unit), the MFP 1 (master unit) changes the field of the unread status of the FAX data management table 181 to the "already read" state (S307). That is, when the document printing is performed by the MFP (slave unit), the field of the unread status of the FAX data management table 181 is set to "already read" when the printing by the selected MFP 8 (slave unit) is completed normally On the other hand, when the printing by the MFP 8 (slave unit) fails and the print result=NG is received from the MFP 8 (slave unit), the MFP 1 (master unit) keeps the field of the unread status of the FAX data management table 181 "holding".

As described above, according to the present embodiment, the unread management of the document is performed based on the job execution result of the information processing apparatus generated by the operation, not the operation itself for the document, and based on the job execution result of the FAX linkage system as a whole, not the execution result when the information processing apparatus is viewed alone. As a result, it is possible to reduce the possibility that the unread management of the FAX received document in the FAX linkage system will not meet the user's expectations.

Note that in the present embodiment, the print instruction from the user is received in step S303, but this is not limitative, and it may be set to perform the automatic printing with the MFP 8 (slave unit) at the same time as the accumulation of the document in the MFP 1 (master unit). In this case, the MFP 1 (master unit) determines the unread release based on the result of the printing execution in the automatically performed MFP 8 (slave unit).

An embodiment provides an advantageous effect that an appropriate management of a document received by FAX becomes possible.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
   circuitry configured to:
   accumulate a document received by FAX in a storage;
   control printing of the accumulated document based on a first operation of a user; and
   set a state of the document to unread in response to the document being accumulated in the storage, and set the state of the document to already read on condition that paper ejection of all pages of the document is completed and a second operation of the user is received to set the state of the document to already read.

2. The information processing apparatus according to claim 1, wherein the circuitry is configured not to set the state of the document to already read when the printing of some or all of the pages of the document is not completed.

3. The information processing apparatus according to claim 1, wherein the circuitry is further configured to:
   acquire a state of the output of the document; and
   determine whether the paper ejection of all pages of the document is completed based on the acquired state of the output of the document.

4. The information processing apparatus according to claim 3, wherein the output circuitry is configured to:
   acquire a number of pages of the document, the paper ejection of the pages being completed by the printing of the document; and
   determine whether the paper ejection of all pages of the document is completed based on the number.

5. The information processing apparatus according to claim 3, wherein the circuitry is configured to:
   control delivery of the document;
   acquire a number of pages of the document, the delivery of the pages being completed; and
   determine whether the delivery of all pages of the document is completed based on the number and determine that an output of all pages of the document is completed in response to a determination that the delivery of all pages of the document is completed.

6. The information processing apparatus according to claim 3, wherein the circuitry is further configured to:
   control FAX transmission of the document:
   acquire a number of pages of the document, the FAX transmission of the pages being completed; and
   determine whether the FAX transmission of all pages of the document is completed based on the number and determine that the output of all pages of the document is completed in response to a determination that the FAX transmission of all pages of the document is completed.

7. The information processing apparatus according to claim 1, wherein the circuitry is further configured to display the state of the document on a display device based on a further operation of the user.

8. The information processing apparatus according to claim 1, wherein
   the circuitry is further configured to control transmission of the document accumulated in the storage to a further information processing apparatus, and
   the circuitry is configured to set the state of the document to unread in response to the document being accumulated in the storage, and set the state of the document to already read on condition that the output of all pages of the document is completed and the state of the document is set to already read in the further information processing apparatus.

9. The information processing apparatus according to claim 1, wherein
   the storage comprises a cloud storage to which the information processing apparatus is connected.

10. An information processing method comprising:
    accumulating a document received by FAX in a storage;
    setting a state of the document to unread in response to the document being accumulated in the storage;
    controlling printing of the accumulated document based on a first operation of a user; and
    setting the state of the document to already read on condition that paper ejection of all pages of the document is completed and a second operation of the user is received to set the state of the document to already read.

* * * * *